(12) United States Patent
Cao et al.

(10) Patent No.: US 9,323,020 B2
(45) Date of Patent: Apr. 26, 2016

(54) FIBER OPTIC TERMINAL HAVING ADAPTER PANEL SUPPORTING BOTH INPUT AND OUTPUT FIBERS FROM AN OPTICAL SPLITTER

(75) Inventors: Songhua Cao, Shanghai (CN); Guy Joachin Castonguay, Shanghai (CN); Bin Dai, Shanghai (CN)

(73) Assignee: Corning Cable Systems (Shanghai) Co. LTD, Hickory, NC (US)

( * ) Notice: Subject to any disclaimer, the term of this patent is extended or adjusted under 35 U.S.C. 154(b) by 0 days.

(21) Appl. No.: 13/083,110

(22) Filed: Apr. 8, 2011

(65) Prior Publication Data

US 2011/0222831 A1  Sep. 15, 2011

Related U.S. Application Data

(63) Continuation of application No. PCT/CN2008/072625, filed on Oct. 9, 2008.

(51) Int. Cl.
*G02B 6/44* (2006.01)

(52) U.S. Cl.
CPC ............ *G02B 6/4441* (2013.01); *G02B 6/4452* (2013.01); *G02B 6/4471* (2013.01); *Y10T 29/49826* (2015.01)

(58) Field of Classification Search
USPC ........................................................ 385/135
See application file for complete search history.

(56) References Cited

U.S. PATENT DOCUMENTS

| | | |
|---|---|---|
| 1,280,393 A | 10/1918 | Cannon |
| 1,703,255 A | 2/1929 | Wagner |
| 2,003,147 A | 5/1935 | Holm-Hansen |
| 2,044,073 A | 6/1936 | Hurley |
| 2,131,408 A | 9/1938 | Murrer |
| 2,428,149 A | 9/1947 | Falk |
| 2,681,201 A | 6/1954 | Grunwald |

(Continued)

FOREIGN PATENT DOCUMENTS

| | | | |
|---|---|---|---|
| CN | 2893724 | 4/2007 | |
| CN | 2893724 Y | 4/2007 | ............... G02B 6/26 |

(Continued)

OTHER PUBLICATIONS

Non-final Office Action for U.S. Appl. No. 12/417,250 mailed Jun. 23, 2011, 9 pages.

(Continued)

*Primary Examiner* — John M Bedtelyon

(57) ABSTRACT

A fiber optic terminal configured to optically connect optical fibers from received network-side and subscriber-side fiber(s) to facilitate providing direct or intermediate optical connections between a fiber optic network and a destination. The fiber optic terminal includes at least one adapter module comprising at least one adapter panel. The adapter panel is configured to receive both an input fiber and one or more of a plurality of output fibers from an optical splitter. To establish optical connections between the network-side and subscriber-side fiber(s), the input fiber from the optical splitter is optically connected to an input fiber optic adapter on the adapter panel, which is optically connected to the at least one network-side fiber. One or more of the plurality of output fibers from the optical splitter are optically connected to one or more output fiber optic adapters on the adapter panel, which are optically connected to the subscriber-side fibers.

23 Claims, 8 Drawing Sheets

(56) References Cited

U.S. PATENT DOCUMENTS

| | | |
|---|---|---|
| 2,984,488 A | 5/1961 | Kirchner |
| 3,054,994 A | 9/1962 | Haram |
| 3,089,915 A | 5/1963 | Plummer |
| 3,204,867 A | 9/1965 | Wahlbom |
| 3,435,124 A | 3/1969 | Channell |
| 3,663,762 A | 5/1972 | Joel, Jr. |
| 3,880,390 A | 4/1975 | Niven |
| 4,006,540 A | 2/1977 | Lemelson |
| 4,012,010 A | 3/1977 | Friedman |
| 4,073,560 A | 2/1978 | Anhalt et al. |
| 4,123,012 A | 10/1978 | Hough |
| 4,177,961 A | 12/1979 | Gruenewald |
| 4,210,380 A | 7/1980 | Brzostek |
| D257,613 S | 12/1980 | Gruenewald |
| 4,244,544 A | 1/1981 | Kornat |
| 4,261,529 A | 4/1981 | Sandberg et al. |
| 4,261,644 A | 4/1981 | Giannaris |
| 4,391,303 A | 7/1983 | Holgersson |
| 4,480,449 A | 11/1984 | Getz et al. |
| 4,497,457 A | 2/1985 | Harvey |
| 4,502,754 A | 3/1985 | Kawa |
| 4,506,698 A | 3/1985 | Garcia et al. |
| 4,524,384 A | 6/1985 | Lefkowitz et al. |
| D281,574 S | 12/1985 | O'Hara, II |
| 4,573,212 A | 2/1986 | Lipsky |
| 4,579,310 A | 4/1986 | Wells et al. |
| 4,586,675 A | 5/1986 | Brown |
| 4,595,255 A | 6/1986 | Bhatt et al. |
| 4,611,887 A | 9/1986 | Glover et al. |
| 4,697,873 A | 10/1987 | Bouvard et al. |
| 4,736,100 A | 4/1988 | Vastagh |
| 4,747,020 A | 5/1988 | Brickley et al. |
| 4,778,125 A | 10/1988 | Hu |
| 4,806,814 A | 2/1989 | Nold |
| 4,810,054 A | 3/1989 | Shinbori et al. |
| 4,812,004 A | 3/1989 | Biederstedt et al. |
| 4,824,193 A | 4/1989 | Maeda et al. |
| 4,836,479 A | 6/1989 | Adams |
| 4,844,573 A | 7/1989 | Gillham et al. |
| 4,884,863 A | 12/1989 | Throckmorton |
| 4,900,118 A | 2/1990 | Yanagawa et al. |
| 4,900,123 A | 2/1990 | Barlow et al. |
| 4,939,819 A | 7/1990 | Moyer |
| 4,948,220 A | 8/1990 | Violo et al. |
| 4,961,623 A | 10/1990 | Midkiff et al. |
| 4,979,749 A | 12/1990 | Onanian |
| 4,995,688 A | 2/1991 | Anton et al. |
| 5,007,701 A | 4/1991 | Roberts |
| 5,023,646 A | 6/1991 | Ishida et al. |
| 5,048,916 A | 9/1991 | Caron |
| 5,048,926 A | 9/1991 | Tanimoto |
| 5,057,646 A | 10/1991 | Nichols et al. |
| 5,059,927 A | 10/1991 | Cohen |
| 5,066,149 A | 11/1991 | Wheeler et al. |
| 5,071,211 A | 12/1991 | Debortoli et al. |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,085,384 A | 2/1992 | Kasubke |
| 5,112,014 A | 5/1992 | Nichols |
| D327,312 S | 6/1992 | Myojo |
| 5,121,458 A | 6/1992 | Nilsson et al. |
| 5,142,598 A | 8/1992 | Tabone |
| D330,368 S | 10/1992 | Bourgeois et al. |
| 5,189,410 A | 2/1993 | Kosugi et al. |
| 5,204,929 A | 4/1993 | Machall et al. |
| 5,209,441 A | 5/1993 | Satoh |
| 5,210,374 A | 5/1993 | Channell |
| 5,214,735 A | 5/1993 | Henneberger et al. |
| 5,218,664 A | 6/1993 | O'Neill et al. |
| 5,231,687 A | 7/1993 | Handley |
| 5,233,674 A | 8/1993 | Vladic |
| 5,243,679 A | 9/1993 | Sharrow et al. |
| 5,255,161 A | 10/1993 | Knoll et al. |
| 5,260,957 A | 11/1993 | Hakimi et al. |
| 5,261,020 A | 11/1993 | de Jong et al. |
| 5,265,187 A | 11/1993 | Morin et al. |
| 5,271,585 A | 12/1993 | Zetena, Jr. |
| 5,274,731 A | 12/1993 | White |
| 5,287,428 A | 2/1994 | Shibata |
| 5,317,663 A | 5/1994 | Beard et al. |
| 5,323,480 A | 6/1994 | Mullaney et al. |
| 5,333,221 A | 7/1994 | Briggs et al. |
| 5,333,222 A | 7/1994 | Belenkiy et al. |
| 5,348,240 A | 9/1994 | Carmo et al. |
| 5,359,688 A | 10/1994 | Underwood |
| 5,363,465 A | 11/1994 | Korkowski et al. |
| 5,367,598 A | 11/1994 | Devenish, III et al. |
| 5,375,185 A | 12/1994 | Hermsen et al. |
| 5,383,051 A | 1/1995 | Delrosso et al. |
| 5,402,515 A | 3/1995 | Vidacovich et al. |
| 5,408,557 A | 4/1995 | Hsu |
| RE34,955 E | 5/1995 | Anton et al. |
| 5,420,956 A | 5/1995 | Grugel et al. |
| 5,420,958 A | 5/1995 | Henson et al. |
| 5,428,705 A | 6/1995 | Hermsen et al. |
| 5,432,875 A | 7/1995 | Korkowski et al. |
| 5,438,641 A | 8/1995 | Malacarne |
| 5,442,726 A | 8/1995 | Howard et al. |
| 5,448,015 A | 9/1995 | Jamet et al. |
| 5,460,342 A | 10/1995 | Dore et al. |
| 5,463,186 A | 10/1995 | Schricker |
| 5,473,115 A | 12/1995 | Brownlie et al. |
| 5,479,553 A | 12/1995 | Daems et al. |
| 5,479,554 A | 12/1995 | Roberts |
| 5,490,229 A | 2/1996 | Ghandeharizadeh et al. |
| 5,497,444 A | 3/1996 | Wheeler |
| 5,515,472 A | 5/1996 | Mullaney et al. |
| 5,542,015 A | 7/1996 | Hultermans |
| 5,548,678 A | 8/1996 | Frost et al. |
| 5,553,183 A | 9/1996 | Bechamps |
| 5,553,186 A | 9/1996 | Allen |
| 5,556,060 A | 9/1996 | Bingham et al. |
| 5,559,922 A | 9/1996 | Arnett |
| 5,570,895 A | 11/1996 | McCue et al. |
| 5,579,425 A | 11/1996 | Lampert et al. |
| 5,590,234 A | 12/1996 | Pulido |
| 5,607,126 A | 3/1997 | Cordola et al. |
| 5,613,030 A | 3/1997 | Hoffer et al. |
| 5,617,501 A | 4/1997 | Miller et al. |
| 5,627,925 A | 5/1997 | Alferness et al. |
| 5,647,043 A | 7/1997 | Anderson et al. |
| 5,649,042 A | 7/1997 | Saito |
| 5,652,814 A | 7/1997 | Pan et al. |
| 5,659,655 A | 8/1997 | Pilatos |
| 5,689,605 A | 11/1997 | Cobb et al. |
| 5,689,607 A | 11/1997 | Vincent et al. |
| 5,692,299 A | 12/1997 | Daems et al. |
| 5,694,511 A | 12/1997 | Pimpinella et al. |
| 5,706,384 A | 1/1998 | Peacock et al. |
| 5,708,751 A | 1/1998 | Mattei |
| 5,717,810 A | 2/1998 | Wheeler |
| 5,724,469 A | 3/1998 | Orlando |
| 5,731,546 A | 3/1998 | Miles et al. |
| 5,734,776 A | 3/1998 | Puetz |
| 5,737,475 A | 4/1998 | Regester |
| 5,751,882 A | 5/1998 | Daems et al. |
| 5,758,004 A | 5/1998 | Alarcon et al. |
| 5,764,843 A | 6/1998 | Macken et al. |
| 5,774,612 A | 6/1998 | Belenkiy et al. |
| 5,775,648 A | 7/1998 | Metzger |
| 5,777,771 A | 7/1998 | Smith |
| 5,778,132 A | 7/1998 | Csipkes et al. |
| 5,781,678 A | 7/1998 | Sano et al. |
| 5,793,920 A | 8/1998 | Wilkins et al. |
| 5,793,921 A | 8/1998 | Wilkins et al. |
| 5,796,908 A | 8/1998 | Vicory |
| 5,802,237 A | 9/1998 | Pulido |
| 5,810,461 A | 9/1998 | Ive et al. |
| 5,816,081 A | 10/1998 | Johnston |
| 5,823,646 A | 10/1998 | Arizpe et al. |
| 5,825,955 A | 10/1998 | Ernst et al. |
| 5,825,961 A | 10/1998 | Wilkins et al. |

(56) References Cited

U.S. PATENT DOCUMENTS

| | | |
|---|---|---|
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,867,621 A | 2/1999 | Luther et al. |
| 5,867,763 A | 2/1999 | Dean et al. |
| 5,870,519 A | 2/1999 | Jenkins et al. |
| 5,880,864 A | 3/1999 | Williams et al. |
| 5,881,200 A | 3/1999 | Burt |
| 5,883,995 A | 3/1999 | Lu |
| 5,884,003 A | 3/1999 | Cloud et al. |
| 5,892,877 A | 4/1999 | Meyerhoefer |
| 5,909,526 A | 6/1999 | Roth et al. |
| 5,930,425 A | 7/1999 | Abel et al. |
| 5,945,633 A | 8/1999 | Ott et al. |
| 5,946,440 A | 8/1999 | Puetz |
| 5,956,439 A | 9/1999 | Pimpinella |
| 5,956,444 A | 9/1999 | Duda et al. |
| 5,969,294 A | 10/1999 | Eberle et al. |
| 5,975,769 A | 11/1999 | Larson et al. |
| 5,978,540 A | 11/1999 | Bechamps et al. |
| 6,009,225 A | 12/1999 | Ray et al. |
| 6,027,252 A | 2/2000 | Erdman et al. |
| 6,044,193 A | 3/2000 | Szentesi et al. |
| 6,059,215 A | 5/2000 | Finnis |
| 6,061,492 A | 5/2000 | Strause et al. |
| 6,065,968 A | 5/2000 | Corliss |
| 6,079,881 A | 6/2000 | Roth |
| D427,897 S | 7/2000 | Johnston et al. |
| 6,118,075 A | 9/2000 | Baker et al. |
| 6,129,221 A | 10/2000 | Shaha |
| 6,149,315 A | 11/2000 | Stephenson |
| 6,151,436 A | 11/2000 | Burek et al. |
| 6,160,946 A | 12/2000 | Thompson et al. |
| D436,027 S | 1/2001 | Johnston et al. |
| 6,175,079 B1 | 1/2001 | Johnston et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,208,796 B1 | 3/2001 | Williams Vigliaturo |
| 6,215,938 B1 | 4/2001 | Reitmeier et al. |
| 6,226,111 B1 | 5/2001 | Chang et al. |
| 6,227,717 B1 | 5/2001 | Ott et al. |
| 6,234,683 B1 | 5/2001 | Waldron et al. |
| 6,236,795 B1 | 5/2001 | Rodgers |
| 6,240,229 B1 | 5/2001 | Roth |
| 6,243,526 B1 | 6/2001 | Garibay et al. |
| 6,245,998 B1 | 6/2001 | Curry et al. |
| 6,259,851 B1 | 7/2001 | Daoud |
| 6,263,136 B1 | 7/2001 | Jennings et al. |
| 6,263,141 B1 | 7/2001 | Smith |
| 6,269,212 B1 | 7/2001 | Schiattone |
| 6,275,640 B1 | 8/2001 | Hunsinger et al. |
| 6,275,641 B1 | 8/2001 | Daoud |
| 6,278,829 B1 | 8/2001 | Buabbud et al. |
| 6,278,831 B1 | 8/2001 | Henderson et al. |
| 6,289,159 B1 | 9/2001 | Van Hees et al. |
| 6,292,614 B1 | 9/2001 | Smith et al. |
| 6,304,707 B1 | 10/2001 | Daems et al. |
| 6,307,997 B1 | 10/2001 | Walters et al. |
| 6,307,998 B2 | 10/2001 | Williams Vigliaturo |
| 6,311,007 B1 | 10/2001 | Daoud |
| RE37,489 E | 1/2002 | Anton et al. |
| 6,343,313 B1 | 1/2002 | Salesky et al. |
| 6,347,888 B1 | 2/2002 | Puetz |
| 6,351,592 B1 | 2/2002 | Ehn et al. |
| 6,353,696 B1 | 3/2002 | Gordon et al. |
| 6,353,697 B1 | 3/2002 | Daoud |
| 6,359,228 B1 | 3/2002 | Strause et al. |
| 6,363,183 B1 | 3/2002 | Koh |
| 6,363,200 B1 | 3/2002 | Thompson et al. |
| 6,370,294 B1 | 4/2002 | Pfeiffer et al. |
| 6,385,381 B1 | 5/2002 | Janus et al. |
| 6,397,166 B1 | 5/2002 | Leung et al. |
| 6,404,775 B1 | 6/2002 | Leslie et al. |
| 6,411,767 B1 | 6/2002 | Burrous et al. |
| 6,414,624 B2 | 7/2002 | Endo et al. |
| 6,418,262 B1 | 7/2002 | Puetz et al. |
| 6,424,781 B1 | 7/2002 | Puetz et al. |
| 6,424,782 B1 | 7/2002 | Ray |
| 6,425,694 B1 | 7/2002 | Szilagyi et al. |
| 6,427,035 B1 | 7/2002 | Mahony |
| 6,431,762 B1 | 8/2002 | Taira et al. |
| 6,434,313 B1 | 8/2002 | Clapp, Jr. et al. |
| 6,434,316 B1 | 8/2002 | Grois et al. |
| 6,438,310 B1 | 8/2002 | Lance et al. |
| 6,439,780 B1 | 8/2002 | Mudd et al. |
| D463,253 S | 9/2002 | Canty |
| 6,452,925 B1 | 9/2002 | Sistanizadeh et al. |
| 6,456,772 B1 | 9/2002 | Daoud |
| 6,464,402 B1 | 10/2002 | Andrews et al. |
| D466,087 S | 11/2002 | Cuny et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,991 B1 | 11/2002 | Sher |
| 6,496,640 B1 | 12/2002 | Harvey et al. |
| 6,499,608 B1 | 12/2002 | Sterling et al. |
| D468,996 S | 1/2003 | Sarkinen et al. |
| 6,507,691 B1 | 1/2003 | Hunsinger et al. |
| 6,522,814 B2 | 2/2003 | Yoshida et al. |
| 6,532,332 B2 | 3/2003 | Solheid et al. |
| 6,535,682 B1 | 3/2003 | Puetz et al. |
| 6,539,155 B1 | 3/2003 | Broeng et al. |
| 6,539,160 B2 | 3/2003 | Battey et al. |
| 6,542,652 B1 | 4/2003 | Mahony |
| 6,542,688 B1 | 4/2003 | Battey et al. |
| 6,543,100 B1 | 4/2003 | Finley et al. |
| 6,554,485 B1 | 4/2003 | Beatty et al. |
| 6,556,738 B2 | 4/2003 | Pfeiffer et al. |
| 6,556,763 B1 | 4/2003 | Puetz et al. |
| 6,567,601 B2 | 5/2003 | Daoud et al. |
| 6,570,913 B1 | 5/2003 | Chen |
| 6,571,047 B1 | 5/2003 | Yarkosky et al. |
| 6,577,595 B1 | 6/2003 | Counterman |
| 6,577,801 B2 | 6/2003 | Broderick et al. |
| 6,579,014 B2 | 6/2003 | Melton et al. |
| 6,580,867 B2 | 6/2003 | Galaj et al. |
| 6,581,788 B2 | 6/2003 | Winig et al. |
| 6,591,051 B2 | 7/2003 | Solheid et al. |
| 6,594,434 B1 | 7/2003 | Davidson et al. |
| 6,597,670 B1 | 7/2003 | Tweedy et al. |
| 6,598,949 B2 | 7/2003 | Frazier et al. |
| 6,612,515 B1 | 9/2003 | Tinucci et al. |
| 6,614,953 B2 | 9/2003 | Strasser et al. |
| 6,614,974 B2 | 9/2003 | Elrefaie et al. |
| 6,614,980 B1 | 9/2003 | Mahony |
| 6,621,952 B1 | 9/2003 | Pi et al. |
| 6,621,975 B2 | 9/2003 | Laporte et al. |
| 6,625,374 B2 | 9/2003 | Holman et al. |
| 6,625,375 B1 | 9/2003 | Mahony |
| 6,631,237 B2 | 10/2003 | Knudsen et al. |
| 6,633,717 B1 | 10/2003 | Knight et al. |
| 6,640,028 B1 | 10/2003 | Schroll et al. |
| RE38,311 E | 11/2003 | Wheeler |
| 6,652,163 B2 | 11/2003 | Fajardo et al. |
| 6,654,536 B2 | 11/2003 | Battey et al. |
| 6,668,127 B1 | 12/2003 | Mahony |
| 6,674,952 B2 | 1/2004 | Howell et al. |
| 6,710,366 B1 | 3/2004 | Lee et al. |
| 6,711,339 B2 | 3/2004 | Puetz et al. |
| 6,714,800 B2 | 3/2004 | Johnson et al. |
| 6,715,619 B2 | 4/2004 | Kim et al. |
| 6,717,058 B2 | 4/2004 | Booth et al. |
| 6,741,784 B1 | 5/2004 | Guan |
| D491,286 S | 6/2004 | Winig et al. |
| D491,287 S | 6/2004 | Winig et al. |
| D491,449 S | 6/2004 | Winig et al. |
| 6,748,155 B2 | 6/2004 | Kim et al. |
| 6,760,531 B1 | 7/2004 | Solheid et al. |
| 6,766,094 B2 | 7/2004 | Smith et al. |
| D495,067 S | 8/2004 | Winig et al. |
| 6,778,752 B2 | 8/2004 | Laporte et al. |
| 6,792,191 B1 * | 9/2004 | Clapp et al. .................. 385/135 |

(56) References Cited

U.S. PATENT DOCUMENTS

| | | | |
|---|---|---|---|
| 6,795,633 | B2 | 9/2004 | Joseph, II |
| 6,801,695 | B2 | 10/2004 | Lanier et al. |
| 6,802,724 | B1 | 10/2004 | Mahony |
| 6,804,447 | B2 | 10/2004 | Smith et al. |
| 6,809,258 | B1 | 10/2004 | Dang et al. |
| D498,005 | S | 11/2004 | Winig et al. |
| 6,816,661 | B1 | 11/2004 | Barnes et al. |
| 6,819,856 | B2 | 11/2004 | Dagley et al. |
| 6,819,857 | B2 | 11/2004 | Douglas et al. |
| 6,845,207 | B2 | 1/2005 | Schray et al. |
| 6,850,685 | B2 | 2/2005 | Tinucci et al. |
| 6,865,232 | B1 | 3/2005 | Isaksson et al. |
| 6,865,334 | B2 | 3/2005 | Cooke et al. |
| 6,870,734 | B2 | 3/2005 | Mertesdorf et al. |
| 6,870,997 | B2 | 3/2005 | Cooke et al. |
| 6,879,545 | B2 | 4/2005 | Cooke et al. |
| 6,880,982 | B2 | 4/2005 | Imamura |
| 6,885,798 | B2 | 4/2005 | Zimmel |
| 6,915,058 | B2 | 7/2005 | Pons |
| 6,915,059 | B2 | 7/2005 | Daoud et al. |
| 6,915,529 | B1 | 7/2005 | Suematsu et al. |
| 6,920,273 | B2 | 7/2005 | Knudsen |
| 6,920,274 | B2 | 7/2005 | Rapp et al. |
| 6,925,241 | B2 | 8/2005 | Bohle et al. |
| 6,925,852 | B2 | 8/2005 | Susko |
| 6,932,514 | B2 | 8/2005 | Anderson et al. |
| 6,934,451 | B2 | 8/2005 | Cooke et al. |
| 6,937,807 | B2 | 8/2005 | Franklin et al. |
| 6,946,605 | B2 | 9/2005 | Levesque et al. |
| 6,946,989 | B2 | 9/2005 | Vavik |
| 6,967,347 | B2 | 11/2005 | Estes et al. |
| 6,968,107 | B2 | 11/2005 | Belardi et al. |
| 6,983,095 | B2 | 1/2006 | Reagan et al. |
| 6,986,608 | B2 | 1/2006 | Choudhury et al. |
| 6,993,228 | B2 | 1/2006 | Burke, Jr. et al. |
| 7,002,511 | B1 | 2/2006 | Ammar et al. |
| 7,006,748 | B2 | 2/2006 | Dagley et al. |
| 7,027,695 | B2 | 4/2006 | Cooke et al. |
| 7,054,513 | B2 | 5/2006 | Herz et al. |
| 7,068,907 | B2 | 6/2006 | Schray |
| 7,083,051 | B2 | 8/2006 | Smith et al. |
| 7,088,891 | B2 | 8/2006 | Jung et al. |
| 7,110,654 | B2 | 9/2006 | Dillat |
| 7,120,347 | B2 | 10/2006 | Blackwell, Jr. et al. |
| 7,128,470 | B2 | 10/2006 | Scherer et al. |
| 7,130,519 | B2 * | 10/2006 | Grubish et al. ............. 385/135 |
| 7,139,462 | B1 * | 11/2006 | Richtman ............. G02B 6/4471 385/134 |
| 7,142,763 | B2 | 11/2006 | Frohlich et al. |
| 7,142,764 | B2 * | 11/2006 | Allen et al. ............. 385/135 |
| 7,155,106 | B2 | 12/2006 | Cianciotto et al. |
| 7,171,121 | B1 | 1/2007 | Skarica et al. |
| 7,181,142 | B1 | 2/2007 | Xu et al. |
| 7,200,316 | B2 | 4/2007 | Giraud et al. |
| 7,200,317 | B2 | 4/2007 | Reagan et al. |
| 7,201,595 | B1 | 4/2007 | Morello |
| 7,215,865 | B2 | 5/2007 | Bellekens et al. |
| 7,218,828 | B2 | 5/2007 | Feustel et al. |
| 7,245,811 | B2 | 7/2007 | Takeda et al. |
| 7,260,302 | B2 | 8/2007 | Caveney |
| 7,264,402 | B2 | 9/2007 | Theuerkorn et al. |
| 7,266,283 | B2 | 9/2007 | Kline et al. |
| 7,272,291 | B2 | 9/2007 | Bayazit et al. |
| 7,274,852 | B1 | 9/2007 | Smrha et al. |
| 7,280,011 | B2 | 10/2007 | Bayar et al. |
| 7,280,733 | B2 | 10/2007 | Larson et al. |
| 7,289,731 | B2 | 10/2007 | Thinguldstad |
| 7,298,951 | B2 | 11/2007 | Smrha et al. |
| 7,302,153 | B2 | 11/2007 | Thom |
| 7,310,471 | B2 | 12/2007 | Bayazit et al. |
| 7,330,629 | B2 | 2/2008 | Cooke et al. |
| 7,331,722 | B2 | 2/2008 | Tan |
| 7,340,001 | B2 | 3/2008 | Smith et al. |
| 7,348,843 | B1 | 3/2008 | Qiu et al. |
| 7,349,616 | B1 | 3/2008 | Castonguay et al. |
| 7,349,634 | B2 | 3/2008 | Sasai et al. |
| 7,369,741 | B2 | 5/2008 | Reagan et al. |
| 7,376,325 | B1 | 5/2008 | Cloud et al. |
| 7,379,650 | B2 | 5/2008 | Weinert et al. |
| 7,379,669 | B2 | 5/2008 | Kim |
| 7,406,241 | B1 | 7/2008 | Opaluch et al. |
| 7,406,242 | B1 | 7/2008 | Braga |
| 7,412,145 | B2 | 8/2008 | Honma et al. |
| 7,418,182 | B2 | 8/2008 | Krampotich |
| 7,418,184 | B1 | 8/2008 | Gonzales et al. |
| 7,421,182 | B2 | 9/2008 | Bayazit et al. |
| 7,450,806 | B2 | 11/2008 | Bookbinder et al. |
| 7,454,222 | B2 | 11/2008 | Huang et al. |
| 7,460,757 | B2 | 12/2008 | Hoehne et al. |
| 7,471,867 | B2 | 12/2008 | Vogel et al. |
| 7,477,826 | B2 | 1/2009 | Mullaney et al. |
| 7,489,641 | B2 | 2/2009 | Miller et al. |
| 7,496,269 | B1 | 2/2009 | Lee |
| 7,509,016 | B2 | 3/2009 | Smith et al. |
| 7,522,805 | B2 | 4/2009 | Smith et al. |
| 7,526,174 | B2 | 4/2009 | Leon et al. |
| 7,548,680 | B2 | 6/2009 | Castonguay et al. |
| 7,565,080 | B2 | 7/2009 | Mickelsson et al. |
| 7,583,896 | B2 | 9/2009 | Taniguchi et al. |
| 7,593,704 | B2 | 9/2009 | Pinel et al. |
| 7,599,672 | B2 | 10/2009 | Shoji et al. |
| 7,609,967 | B2 | 10/2009 | Hochbaum et al. |
| 7,613,376 | B2 | 11/2009 | Wright et al. |
| 7,623,749 | B2 | 11/2009 | Reagan et al. |
| 7,636,507 | B2 | 12/2009 | Lu et al. |
| 7,664,361 | B2 | 2/2010 | Trebesch et al. |
| 7,672,591 | B2 | 3/2010 | Soto et al. |
| 7,690,848 | B2 | 4/2010 | Faika et al. |
| 7,697,574 | B2 | 4/2010 | Suematsu et al. |
| 7,766,732 | B2 | 8/2010 | Hauville |
| 7,769,265 | B2 | 8/2010 | Cairns |
| 7,787,823 | B2 | 8/2010 | George et al. |
| 7,812,775 | B2 | 10/2010 | Babakhani et al. |
| 7,822,310 | B2 | 10/2010 | Castonguay et al. |
| 7,826,705 | B2 | 11/2010 | McGranahan et al. |
| 7,844,161 | B2 | 11/2010 | Reagan et al. |
| 7,880,677 | B2 | 2/2011 | Rofougaran et al. |
| 7,881,753 | B2 | 2/2011 | Rofougaran |
| 7,889,961 | B2 | 2/2011 | Cote et al. |
| 7,912,506 | B2 | 3/2011 | Lovberg et al. |
| 7,936,960 | B2 | 5/2011 | McGranahan |
| 7,965,837 | B2 | 6/2011 | Kawasaki et al. |
| 7,970,249 | B2 | 6/2011 | Solheid et al. |
| 7,974,509 | B2 | 7/2011 | Smith et al. |
| 8,023,792 | B2 | 9/2011 | Ciechomski et al. |
| 8,023,886 | B2 | 9/2011 | Rofougaran |
| 8,027,656 | B2 | 9/2011 | Rofougaran et al. |
| 8,073,329 | B2 | 12/2011 | Gao et al. |
| 8,086,085 | B2 | 12/2011 | Lu et al. |
| 8,107,815 | B2 | 1/2012 | Akasaka et al. |
| 8,135,257 | B2 | 3/2012 | Cooke et al. |
| 8,265,447 | B2 | 9/2012 | Loeffelholz et al. |
| 8,280,217 | B2 | 10/2012 | Lapp et al. |
| 8,351,754 | B2 | 1/2013 | Bell |
| 8,351,792 | B2 | 1/2013 | Zheng |
| 8,374,508 | B2 | 2/2013 | Soto et al. |
| 8,380,036 | B2 | 2/2013 | Smith |
| 8,422,883 | B2 | 4/2013 | Yeh et al. |
| 8,437,595 | B2 | 5/2013 | Womack et al. |
| 8,452,178 | B2 | 5/2013 | Gao et al. |
| 8,465,317 | B2 | 6/2013 | Gniadek et al. |
| 8,467,651 | B2 | 6/2013 | Cao et al. |
| 8,488,966 | B2 | 7/2013 | Zheng |
| 8,520,996 | B2 | 8/2013 | Cowen et al. |
| 8,660,397 | B2 | 2/2014 | Giraud et al. |
| 8,712,206 | B2 | 4/2014 | Cooke et al. |
| 8,792,767 | B2 | 7/2014 | Fabrykowski et al. |
| 8,798,427 | B2 | 8/2014 | Cox et al. |
| 8,879,882 | B2 | 11/2014 | Conner et al. |
| 8,909,019 | B2 | 12/2014 | Fabrykowski et al. |
| 9,004,778 | B2 | 4/2015 | Isenhour et al. |
| 9,049,500 | B2 | 6/2015 | Conner et al. |
| 2001/0001270 | A1 | 5/2001 | Williams Vigliaturo |
| 2001/0036351 | A1 | 11/2001 | Fritz |

(56) References Cited

U.S. PATENT DOCUMENTS

| | | |
|---|---|---|
| 2002/0012336 A1 | 1/2002 | Hughes et al. |
| 2002/0034290 A1 | 3/2002 | Pershan |
| 2002/0037136 A1 | 3/2002 | Wang et al. |
| 2002/0051616 A1 | 5/2002 | Battey et al. |
| 2002/0118929 A1 | 8/2002 | Brun et al. |
| 2002/0128009 A1 | 9/2002 | Boch et al. |
| 2002/0148846 A1 | 10/2002 | Luburic |
| 2002/0150372 A1 | 10/2002 | Schray |
| 2002/0180163 A1 | 12/2002 | Muller et al. |
| 2002/0181896 A1 | 12/2002 | McClellan et al. |
| 2002/0181905 A1 | 12/2002 | Yoshida et al. |
| 2003/0022645 A1 | 1/2003 | Runzo |
| 2003/0031419 A1 | 2/2003 | Simmons et al. |
| 2003/0063866 A1 | 4/2003 | Melton et al. |
| 2003/0063875 A1 | 4/2003 | Bickham et al. |
| 2003/0095774 A1 | 5/2003 | Bohme et al. |
| 2003/0103750 A1 | 6/2003 | Laporte et al. |
| 2003/0132685 A1 | 7/2003 | Sucharczuk et al. |
| 2003/0134541 A1 | 7/2003 | Johnsen et al. |
| 2003/0142946 A1 | 7/2003 | Saito et al. |
| 2003/0147597 A1 | 8/2003 | Duran |
| 2003/0174996 A1 | 9/2003 | Henschel et al. |
| 2003/0185535 A1 | 10/2003 | Tinucci et al. |
| 2003/0194187 A1 | 10/2003 | Simmons et al. |
| 2003/0223725 A1 | 12/2003 | Laporte et al. |
| 2004/0001686 A1 | 1/2004 | Smith et al. |
| 2004/0013390 A1 | 1/2004 | Kim et al. |
| 2004/0042710 A1 | 3/2004 | Margalit et al. |
| 2004/0074852 A1 | 4/2004 | Knudsen et al. |
| 2004/0081404 A1 | 4/2004 | Elliott |
| 2004/0084465 A1 | 5/2004 | Luburic |
| 2004/0106435 A1 | 6/2004 | Bauman et al. |
| 2004/0109660 A1 | 6/2004 | Liberty |
| 2004/0123998 A1 | 7/2004 | Berglund et al. |
| 2004/0139477 A1 | 7/2004 | Russell et al. |
| 2004/0141692 A1 | 7/2004 | Anderson et al. |
| 2004/0146266 A1 | 7/2004 | Solheid et al. |
| 2004/0150267 A1 | 8/2004 | Ferguson |
| 2004/0175090 A1 | 9/2004 | Vastmans et al. |
| 2004/0196404 A1 | 10/2004 | Loheit et al. |
| 2004/0218970 A1 | 11/2004 | Caveney et al. |
| 2004/0228598 A1 | 11/2004 | Allen et al. |
| 2004/0240825 A1 | 12/2004 | Daoud et al. |
| 2004/0264873 A1 | 12/2004 | Smith et al. |
| 2005/0002633 A1 | 1/2005 | Solheid et al. |
| 2005/0036749 A1 | 2/2005 | Vogel et al. |
| 2005/0058451 A1 | 3/2005 | Ross |
| 2005/0100301 A1 | 5/2005 | Solheid et al. |
| 2005/0123261 A1 | 6/2005 | Bellekens et al. |
| 2005/0129379 A1 | 6/2005 | Reagan et al. |
| 2005/0135753 A1 | 6/2005 | Eigenmann et al. |
| 2005/0152306 A1 | 7/2005 | Bonnassieux et al. |
| 2005/0207711 A1 | 9/2005 | Vo et al. |
| 2005/0213921 A1 | 9/2005 | Mertesdorf et al. |
| 2005/0232565 A1 | 10/2005 | Heggestad et al. |
| 2005/0238290 A1 | 10/2005 | Choudhury et al. |
| 2005/0265683 A1 | 12/2005 | Cianciotto et al. |
| 2005/0276562 A1 | 12/2005 | Battey et al. |
| 2005/0281526 A1 | 12/2005 | Vongseng et al. |
| 2006/0029334 A1 | 2/2006 | Quinby et al. |
| 2006/0045524 A1 | 3/2006 | Lee et al. |
| 2006/0049941 A1 | 3/2006 | Hunter et al. |
| 2006/0056327 A1 | 3/2006 | Coersmeier |
| 2006/0072892 A1 | 4/2006 | Serrander et al. |
| 2006/0083461 A1 | 4/2006 | Takahashi et al. |
| 2006/0083468 A1 | 4/2006 | Kahle et al. |
| 2006/0093278 A1 | 5/2006 | Elkins, II et al. |
| 2006/0093301 A1 | 5/2006 | Zimmel et al. |
| 2006/0093303 A1 | 5/2006 | Reagan et al. |
| 2006/0098931 A1 | 5/2006 | Sibley et al. |
| 2006/0127087 A1 | 6/2006 | Kasai et al. |
| 2006/0133753 A1 | 6/2006 | Nelson et al. |
| 2006/0153515 A1 | 7/2006 | Honma et al. |
| 2006/0153516 A1 | 7/2006 | Napiorkowski et al. |
| 2006/0153517 A1 | 7/2006 | Reagan et al. |
| 2006/0165364 A1 | 7/2006 | Frohlich et al. |
| 2006/0165366 A1 | 7/2006 | Feustel et al. .................. 385/135 |
| 2006/0182407 A1 | 8/2006 | Caveney |
| 2006/0182446 A1 | 8/2006 | Kim et al. |
| 2006/0193590 A1 | 8/2006 | Puetz et al. |
| 2006/0210229 A1 | 9/2006 | Scadden |
| 2006/0210230 A1 | 9/2006 | Kline et al. |
| 2006/0215980 A1 | 9/2006 | Bayazit et al. |
| 2006/0223439 A1 | 10/2006 | Pinel et al. |
| 2006/0251373 A1 | 11/2006 | Hodge et al. |
| 2006/0263029 A1 | 11/2006 | Mudd et al. |
| 2006/0269205 A1 | 11/2006 | Zimmel |
| 2006/0269206 A1 | 11/2006 | Zimmel |
| 2006/0269208 A1 | 11/2006 | Allen et al. |
| 2006/0275007 A1 | 12/2006 | Livingston et al. |
| 2006/0275008 A1 | 12/2006 | Xin |
| 2006/0279423 A1 | 12/2006 | Nazari |
| 2006/0285807 A1 | 12/2006 | Lu et al. |
| 2007/0003204 A1 | 1/2007 | Makrides-Saravanos et al. |
| 2007/0003205 A1 | 1/2007 | Saravanos et al. |
| 2007/0023464 A1 | 2/2007 | Barkdoll et al. |
| 2007/0031099 A1 | 2/2007 | Herzog et al. |
| 2007/0031101 A1 | 2/2007 | Kline et al. |
| 2007/0047891 A1 | 3/2007 | Bayazit et al. |
| 2007/0047893 A1 | 3/2007 | Kramer et al. |
| 2007/0047894 A1 | 3/2007 | Holmberg et al. |
| 2007/0052531 A1 | 3/2007 | Mathews et al. |
| 2007/0054682 A1 | 3/2007 | Fanning et al. |
| 2007/0093273 A1 | 4/2007 | Cai |
| 2007/0104447 A1 | 5/2007 | Allen |
| 2007/0114339 A1 | 5/2007 | Winchester |
| 2007/0183732 A1 | 8/2007 | Wittmeier et al. |
| 2007/0189691 A1 | 8/2007 | Barth et al. |
| 2007/0263962 A1 | 11/2007 | Kohda |
| 2007/0268846 A1 | 11/2007 | Proctor, Jr. et al. |
| 2007/0274718 A1 | 11/2007 | Bridges et al. |
| 2007/0280619 A1 | 12/2007 | Conner et al. |
| 2007/0292143 A1 | 12/2007 | Yu et al. |
| 2008/0002652 A1 | 1/2008 | Gupta et al. |
| 2008/0008437 A1 | 1/2008 | Reagan et al. |
| 2008/0063350 A1 | 3/2008 | Trebesch et al. |
| 2008/0063397 A1 | 3/2008 | Hu et al. |
| 2008/0085094 A1 | 4/2008 | Krampotich |
| 2008/0124038 A1* | 5/2008 | Kowalczyk .......... G02B 6/4442 385/135 |
| 2008/0131067 A1 | 6/2008 | Ugolini et al. |
| 2008/0138026 A1 | 6/2008 | Yow et al. |
| 2008/0145008 A1 | 6/2008 | Lewallen et al. |
| 2008/0193091 A1 | 8/2008 | Herbst |
| 2008/0205844 A1 | 8/2008 | Castonguay et al. |
| 2008/0224869 A1 | 9/2008 | Kaplan |
| 2008/0253723 A1 | 10/2008 | Stokes et al. |
| 2008/0259928 A1 | 10/2008 | Chen et al. |
| 2008/0260389 A1 | 10/2008 | Zheng |
| 2008/0285933 A1* | 11/2008 | Vogel .................. G02B 6/4452 385/135 |
| 2008/0292261 A1 | 11/2008 | Kowalczyk et al. |
| 2008/0298743 A1 | 12/2008 | Saravanos et al. |
| 2008/0310464 A1 | 12/2008 | Schneider |
| 2008/0311876 A1 | 12/2008 | Leenaerts et al. |
| 2008/0311944 A1 | 12/2008 | Hansen et al. |
| 2008/0317425 A1 | 12/2008 | Smith et al. |
| 2009/0022470 A1 | 1/2009 | Krampotich |
| 2009/0034929 A1 | 2/2009 | Reinhardt et al. |
| 2009/0047023 A1 | 2/2009 | Pescod et al. |
| 2009/0060440 A1 | 3/2009 | Wright et al. |
| 2009/0074371 A1 | 3/2009 | Bayazit et al. |
| 2009/0081985 A1 | 3/2009 | Rofougaran et al. |
| 2009/0088071 A1 | 4/2009 | Rofougaran |
| 2009/0088072 A1 | 4/2009 | Rofougaran et al. |
| 2009/0097813 A1 | 4/2009 | Hill |
| 2009/0103865 A1 | 4/2009 | Del Rosso |
| 2009/0103878 A1 | 4/2009 | Zimmel |
| 2009/0141780 A1 | 6/2009 | Cruz-Albrecht et al. |
| 2009/0148118 A1 | 6/2009 | Gronvall et al. |
| 2009/0208210 A1 | 8/2009 | Trojer et al. |
| 2009/0211171 A1 | 8/2009 | Summers |
| 2009/0237317 A1 | 9/2009 | Rofougaran |
| 2009/0245743 A1 | 10/2009 | Cote et al. |

(56) References Cited

U.S. PATENT DOCUMENTS

| | | | |
|---|---|---|---|
| 2009/0245746 A1 | 10/2009 | Krampotich et al. | |
| 2009/0247109 A1 | 10/2009 | Rofougaran | |
| 2009/0252462 A1 | 10/2009 | Bonical | |
| 2009/0263122 A1 | 10/2009 | Helkey et al. | |
| 2009/0274429 A1 | 11/2009 | Krampotich et al. | |
| 2009/0278596 A1 | 11/2009 | Rofougaran et al. | |
| 2009/0279593 A1 | 11/2009 | Rofougaran et al. | |
| 2009/0297111 A1* | 12/2009 | Reagan et al. | 385/135 |
| 2009/0304342 A1 | 12/2009 | Adomeit et al. | |
| 2009/0324189 A1 | 12/2009 | Hill et al. | |
| 2010/0040372 A1 | 2/2010 | Gejbrowitz et al. | |
| 2010/0054680 A1 | 3/2010 | Lochkovic et al. | |
| 2010/0061693 A1 | 3/2010 | Bran de Leon et al. | |
| 2010/0092133 A1 | 4/2010 | Conner | |
| 2010/0129030 A1 | 5/2010 | Giraud et al. | |
| 2010/0129040 A1 | 5/2010 | Zamzow et al. | |
| 2010/0142598 A1 | 6/2010 | Murray et al. | |
| 2010/0142955 A1 | 6/2010 | Yu et al. | |
| 2010/0144285 A1 | 6/2010 | Behzad et al. | |
| 2010/0150556 A1 | 6/2010 | Soto et al. | |
| 2010/0150566 A1 | 6/2010 | Soto et al. | |
| 2010/0158525 A1 | 6/2010 | Walter | |
| 2010/0159859 A1 | 6/2010 | Rofougaran | |
| 2010/0183274 A1 | 7/2010 | Brunet et al. | |
| 2010/0189439 A1 | 7/2010 | Novak et al. | |
| 2010/0202745 A1 | 8/2010 | Sokolowski et al. | |
| 2010/0225520 A1 | 9/2010 | Mohamadi et al. | |
| 2010/0239253 A1 | 9/2010 | Lin et al. | |
| 2010/0259682 A1 | 10/2010 | Unger | |
| 2010/0261501 A1 | 10/2010 | Behzad et al. | |
| 2010/0284323 A1 | 11/2010 | Tang et al. | |
| 2010/0290753 A1 | 11/2010 | Tang et al. | |
| 2010/0303431 A1 | 12/2010 | Cox et al. | |
| 2011/0019999 A1 | 1/2011 | George et al. | |
| 2011/0026932 A1 | 2/2011 | Yeh et al. | |
| 2011/0045767 A1 | 2/2011 | Rofougaran et al. | |
| 2011/0052133 A1 | 3/2011 | Simmons et al. | |
| 2011/0066774 A1 | 3/2011 | Rofougaran | |
| 2011/0090942 A1 | 4/2011 | Hardacker et al. | |
| 2011/0097052 A1 | 4/2011 | Solheid et al. | |
| 2011/0116393 A1 | 5/2011 | Hong et al. | |
| 2011/0122912 A1 | 5/2011 | Benjamin et al. | |
| 2011/0135307 A1 | 6/2011 | Conner et al. | |
| 2011/0139942 A1 | 6/2011 | Moore et al. | |
| 2011/0158599 A1 | 6/2011 | Kowalczyk et al. | |
| 2011/0206383 A1 | 8/2011 | Chien et al. | |
| 2011/0222616 A1 | 9/2011 | Jiang et al. | |
| 2011/0262095 A1 | 10/2011 | Fabrykowski et al. | |
| 2011/0262099 A1 | 10/2011 | Castonguay et al. | |
| 2011/0268446 A1 | 11/2011 | Cune et al. | |
| 2011/0274433 A1 | 11/2011 | Presi et al. | |
| 2012/0093473 A1 | 4/2012 | Cox et al. | |
| 2012/0093474 A1 | 4/2012 | Cox et al. | |
| 2012/0104145 A1 | 5/2012 | Dagley et al. | |
| 2012/0114076 A1 | 5/2012 | Morton et al. | |
| 2012/0257893 A1 | 10/2012 | Boyd et al. | |
| 2012/0301096 A1 | 11/2012 | Badar et al. | |
| 2012/0308190 A1 | 12/2012 | Smith et al. | |
| 2012/0309325 A1 | 12/2012 | Carbone et al. | |
| 2013/0016952 A1 | 1/2013 | Knuth | |
| 2013/0034333 A1 | 2/2013 | Holmberg et al. | |
| 2013/0034336 A1 | 2/2013 | Cassell et al. | |
| 2013/0230325 A1 | 9/2013 | Chow et al. | |
| 2013/0295980 A1 | 11/2013 | Reuven et al. | |
| 2014/0099064 A1 | 4/2014 | Fabrykowski et al. | |
| 2014/0119705 A1 | 5/2014 | Fabrykowski et al. | |
| 2014/0153891 A1 | 6/2014 | Ciechomski et al. | |
| 2014/0286643 A1 | 9/2014 | George et al. | |

FOREIGN PATENT DOCUMENTS

| | | | |
|---|---|---|---|
| CN | 1969214 A | 5/2007 | G02B 6/44 |
| DE | 4130706 A1 | 3/1993 | |
| DE | 4133375 C1 | 4/1993 | |
| DE | 4240727 C1 | 2/1994 | |
| DE | 29800194 U1 | 3/1998 | |
| DE | 10005294 A1 | 8/2001 | |
| DE | 10238189 A1 | 2/2004 | |
| DE | 202004011493 U1 | 9/2004 | |
| DE | 20320702 U1 | 10/2005 | |
| DE | 202005018884 U1 | 2/2006 | |
| DE | 202007000556 U1 | 10/2007 | |
| DE | 202007012420 U1 | 10/2007 | |
| DE | 202010009385 U1 | 9/2010 | |
| EP | 0409390 A2 | 1/1991 | |
| EP | 0410622 A2 | 1/1991 | |
| EP | 0415647 A2 | 3/1991 | |
| EP | 0490644 A1 | 6/1992 | |
| EP | 0541820 A1 | 5/1993 | |
| EP | 0593927 A1 | 4/1994 | |
| EP | 0720322 A2 | 7/1996 | |
| EP | 0725468 A1 | 8/1996 | |
| EP | 0828356 A2 | 3/1998 | |
| EP | 0840153 A2 | 5/1998 | |
| EP | 0928053 A2 | 7/1999 | |
| EP | 1107031 A1 | 6/2001 | |
| EP | 1120674 A1 | 8/2001 | |
| EP | 1179745 A2 | 2/2002 | |
| EP | 1203974 A2 | 5/2002 | |
| EP | 1316829 A2 | 6/2003 | |
| EP | 1944635 A2 | 7/2008 | |
| EP | 1944886 A1 | 7/2008 | |
| EP | 2060942 A2 | 5/2009 | |
| EP | 2141527 A2 | 1/2010 | |
| EP | 2180614 A1 | 4/2010 | |
| FR | 2123728 A5 | 9/1972 | |
| FR | 2748576 A1 | 11/1997 | |
| GB | 2254163 A | 9/1992 | |
| JP | 59107317 A | 6/1984 | |
| JP | 6227312 A | 8/1994 | |
| JP | 11125722 A | 5/1999 | |
| JP | 11231163 A | 8/1999 | |
| JP | 2001116968 A | 4/2001 | |
| JP | 2004061713 A | 2/2004 | |
| JP | 2009010595 A | 1/2009 | |
| WO | 8805925 A1 | 8/1988 | |
| WO | 8905989 A1 | 6/1989 | |
| WO | 9507484 A1 | 3/1995 | |
| WO | 9630791 A1 | 10/1996 | |
| WO | 9638752 A1 | 12/1996 | |
| WO | 9722025 A1 | 6/1997 | |
| WO | 9725642 A1 | 7/1997 | |
| WO | 9729608 A1 | 8/1997 | |
| WO | 9736197 A1 | 10/1997 | |
| WO | 0221186 A1 | 3/2002 | |
| WO | 02099528 A1 | 12/2002 | |
| WO | 03009527 A2 | 1/2003 | |
| WO | 03093889 A1 | 11/2003 | |
| WO | 2004086112 A1 | 10/2004 | |
| WO | 2005020400 A1 | 3/2005 | |
| WO | 2005050277 A2 | 6/2005 | |
| WO | 2005088373 A1 | 9/2005 | |
| WO | 2005091036 A1 | 9/2005 | |
| WO | 2006050505 A1 | 5/2006 | |
| WO | 2006127457 A1 | 11/2006 | |
| WO | 2006135524 A3 | 12/2006 | |
| WO | 2007050515 A1 | 5/2007 | |
| WO | 2007089682 A2 | 8/2007 | |
| WO | 2007129953 A1 | 11/2007 | |
| WO | 2008033997 A1 | 3/2008 | |
| WO | 2008048935 A2 | 4/2008 | |
| WO | 2008125217 A1 | 10/2008 | |
| WO | 2008137894 A1 | 11/2008 | |
| WO | 2009029485 A1 | 3/2009 | |

OTHER PUBLICATIONS

Final Office Action for U.S. Appl. No. 12/417,250 mailed Mar. 3, 2011, 9 pages.
Non-final Office Action for U.S. Appl. No. 12/417,250 mailed Jul. 27, 2010, 11 pages.
Advisory Action for U.S. Appl. No. 12/697,628 mailed Mar. 1, 2012, 3 pages.

(56) References Cited

OTHER PUBLICATIONS

Final Office Action for U.S. Appl. No. 12/697,628 mailed Nov. 17, 2011, 15 pages.
Non-final Office Action for U.S. Appl. No. 12/697,628 mailed Apr. 6, 2011, 11 pages.
Advisory Action for U.S. Appl. No. 12/072,187 mailed Aug. 15, 2011, 2 pages.
Final Office Action for U.S. Appl. No. 12/072,187 mailed Jun. 3, 2011, 21 pages.
Non-final Office Action for U.S. Appl. No. 12/072,187 mailed Nov. 30, 2010, 17 pages.
Final Office Action for U.S. Appl. No. 12/630,938 mailed Jun. 1, 2012, 18 pages.
Non-final Office Action for U.S. Appl. No. 12/630,938 mailed Dec. 19, 2011, 15 pages.
Quayle Action for U.S. Appl. No. 12/861,345 mailed Apr. 9, 2012, 6 pages.
Non-final Office Action for U.S. Appl. No. 12/861,345 mailed Dec. 15, 2011, 10 pages.
Non-final Office Action for U.S. Appl. No. 12/700,837 mailed Jan. 30, 2012, 7 pages.
Final Office Action for U.S. Appl. No. 12/474,866 mailed Jan. 31, 2012, 8 pages.
Non-final Office Action for U.S. Appl. No. 12/474,866 mailed Aug. 5, 2011, 9 pages.
International Search Report for PCT/US2009/066779, Aug. 27, 2010, 3 pages.
International Search Report for PCT/EP2009/000929, Apr. 27, 2009, 4 pages.
Final Office Action for U.S. Appl. No. 12/700,837 mailed Aug. 31, 2012, 10 pages.
International Search Report for PCT/US2007/023631, mailed Apr. 21, 2008, 2 pages.
International Search Report for PCT/US2008/000095 mailed Sep. 12, 2008, 5 pages.
International Search Report for PCT/US2008/002514 mailed Aug. 8, 2008, 2 pages.
Notice of Allowance for U.S. Appl. No. 11/595,723 mailed Dec. 28, 2010, 8 pages.
Non-final Office Action for U.S. Appl. No. 11/595,723 mailed Jun. 21, 2010, 9 pages.
Non-final Office Action for U.S. Appl. No. 11/595,723 mailed Jan. 5, 2010 9 pages.
Advisory Action for U.S. Appl. No. 11/595,723 mailed Nov. 24, 2009, 3 pages.
Final Office Action for U.S. Appl. No. 11/595,723 mailed Jul. 8, 2009, 13 pages.
Non-final Office Action for U.S. Appl. No. 11/595,723 mailed Sep. 25, 2008, 13 pages.
Final Office Action for U.S. Appl. No. 11/595,723 mailed Apr. 11, 2008, 12 pages.
Non-final Office Action for U.S. Appl. No. 11/595,723 mailed Jun. 7, 2007 18 pages.
Examiner's Answer to Appeal Brief for U.S. Appl. No. 10/804,958 mailed Apr. 29, 2010, 13 pages.
Non-final Office Action for U.S. Appl. No. 10/804,958 mailed Jul. 22, 2009, 8 pages.
Final Office Action for U.S. Appl. No. 10/804,958 mailed Jun. 11, 2008, 9 pages.
Final Office Action for U.S. Appl. No. 10/804,958 mailed Oct. 9, 2007, 8 pages.
Non-final Office Action for U.S. Appl. No. 10/804,958 mailed Jun. 15, 2007, 7 pages.
Final Office Action for U.S. Appl. No. 10/804,958 mailed Nov. 3, 2006, 7 pages.
Non-final Office Action for U.S. Appl. No. 10/804,958 mailed Apr. 6, 2006, 7 pages.
Non-final Office Action for U.S. Appl. No. 10/804,958 mailed Sep. 21, 2005, 7 pages.
Notice of Allowance for U.S. Appl. No. 11/499,572 mailed Jul. 1, 2010, 7 pages.
Advisory Action for U.S. Appl. No. 11/499,572 mailed Jan. 27, 2010, 3 pages.
Final Office Action for U.S. Appl. No. 11/499,572 mailed Aug. 12, 2009, 9 pages.
Advisory Action for U.S. Appl. No. 11/499,572 mailed May 29, 2009, 3 pages.
Final Office Action for U.S. Appl. No. 11/499,572 mailed Dec. 26, 2008, 8 pages.
Non-final Office Action for U.S. Appl. No. 11/499,572 mailed Jun. 13, 2008, 7 pages.
Notice of Allowance for U.S. Appl. No. 12/012,144 mailed Feb. 10, 2009, 6 pages.
Non-final Office Action for U.S. Appl. No. 12/012,144 mailed Jul. 15, 2008, 5 pages.
Notice of Allowance for U.S. Appl. No. 11/712,168 mailed Apr. 21, 2010, 9 pages.
Notice of Allowance for U.S. Appl. No. 11/712,168 mailed Sep. 18, 2009, 9 pages.
Notice of Allowance for U.S. Appl. No. 11/712,168 mailed Jun. 1, 2009, 7 pages.
Notice of Allowance for U.S. Appl. No. 11/712,168 mailed Apr. 7, 2009, 9 pages.
Advisory Action for U.S. Appl. No. 11/712,168 mailed Oct. 20, 2008, 3 pages.
Final Office Action for U.S. Appl. No. 11/712,168 mailed Jul. 24, 2008, 11 pages.
Non-final Office Action for U.S. Appl. No. 11/712,168 mailed Oct. 9, 2007, 7 pages.
Advisory Action for U.S. Appl. No. 11/809,390 mailed Dec. 14, 2009, 2 pages.
Final Office Action for U.S. Appl. No. 11/809,390 mailed Sep. 25, 2009, 12 pages.
Non-final Office Action for U.S. Appl. No. 11/809,390 mailed Mar. 11, 2009, 9 pages.
Notice of Allowance for U.S. Appl. No. 11/809,390 mailed Nov. 18, 2008, 7 pages.
Non-final Office Action for U.S. Appl. No. 11/809,390 mailed Jul. 25, 2008, 10 pages.
Non-final Office Action for U.S. Appl. No. 11/439,070 mailed Jun. 17, 2009, 9 pages.
Non-final Office Action for U.S. Appl. No. 11/439,070 mailed Oct. 17, 2008, 13 pages.
Non-final Office Action for U.S. Appl. No. 11/439,070 mailed Jan. 11, 2008, 11 pages.
Non-final Office Action for U.S. Appl. No. 11/439,070 mailed May 16, 2007, 16 pages.
Examiner's Answer to Appeal Brief for U.S. Appl. No. 11/975,440 mailed Oct. 22, 2010, 17 pages.
Final Office Action for U.S. Appl. No. 11/975,440 mailed Mar. 8, 2010, 10 pages.
Non-final Office Action for U.S. Appl. No. 11/975,440 mailed Oct. 28, 2009, 7 pages.
Non-final Office Action for U.S. Appl. No. 11/975,440 mailed Jul. 10, 2009, 6 pages.
Notice of Allowance for U.S. Appl. No. 12/566,191 mailed May 24, 2011, 5 pages.
Final Office Action for U.S. Appl. No. 12/566,191 mailed Feb. 15, 2011, 8 pages.
Non-Final Office Action for U.S. Appl. No. 12/566,191 mailed Sep. 30, 2010, 8 pages.
Final Office Action for U.S. Appl. No. 12/229,810 mailed Jun. 9, 2011, 16 pages.
Non-final Office Action for U.S. Appl. No. 12/229,810 mailed Dec. 23, 2010, 16 pages.
Notice of Allowance for U.S. Appl. No. 12/417,250 mailed Nov. 9, 2011, 8 pages.
Decision on Appeal for U.S. Appl. No. 10/804,958 mailed Apr. 18, 2013, 9 pages.
Non-final Office Action for U.S. Appl. No. 12/323,385 mailed Sep. 21, 2011, 10 pages.

(56) References Cited

OTHER PUBLICATIONS

Final Office Action for U.S. Appl. No. 12/323,385 mailed Mar. 6, 2012, 12 pages.
Examiner's Answer to Appeal Brief for U.S. Appl. No. 12/323,385 mailed Feb. 21, 2013, 11 pages.
Non-final Office Action for U.S. Appl. No. 12/625,341 mailed Mar. 21, 2012, 9 pages.
Final Office Action for U.S. Appl. No. 12/625,341 mailed Jul. 10, 2012, 12 pages.
Non-final Office Action for U.S. Appl. No. 12/625,341 mailed Oct. 16, 2012, 8 pages.
Final Office Action for U.S. Appl. No. 12/625,341 mailed Feb. 12, 2013, 10 pages.
Advisory Action for U.S. Appl. No. 12/625,341 mailed Apr. 25, 2013, 6 pages.
Final Office Action for U.S. Appl. No. 13/177,233 mailed Mar. 29, 2013, 9 pages.
Non-final Office Action for U.S. Appl. No. 12/751,860 mailed Jul. 18, 2012, 8 pages.
Final Office Action for U.S. Appl. No. 12/751,860 mailed Nov. 5, 2012, 6 pages.
International Search Report for PCT/US2009/057140 mailed Nov. 9, 2009, 2 pages.
Non-final Office Action for U.S. Appl. No. 13/177,233 mailed Dec. 17, 2012, 7 pages.
Monro et al., "Holey Fibers with random cladding distributions," Optic Letters, vol. 25, No. 4, Feb. 15, 2000, 3 pages.
Non-final Office Action for U.S. Appl. No. 12/892,280 mailed Nov. 6, 2012, 4 pages.
Non-final Office Action for U.S. Appl. No. 13/275,798 mailed Mar. 1, 2013, 8 pages.
Notice of Allowance for U.S. Appl. No. 10/804,958 mailed May 24, 2013, 8 pages.
Final Office Action for U.S. Appl. No. 13/094,572 mailed Jul. 8, 2013, 13 pages.
Decision on Appeal for U.S. Appl. No. 11/975,440 mailed Nov. 4, 2013, 10 pages.
Advisory Action for U.S. Appl. No. 13/094,572 mailed Oct. 7, 2013, 2 pages.
Advisory Action for U.S. Appl. No. 13/275,798 mailed Sep. 12, 2013, 2 pages.
Non-final Office Action for U.S. Appl. No. 13/613,759 mailed Sep. 20, 2013, 10 pages.
Chinese Search Report, Application No. 200880131932.2, Date of Dispatch Nov. 5, 2012, 1 page.
Non-final Office Action for U.S. Appl. No. 13/087,765 mailed Sep. 18, 2013, 8 pages.
Non-final Office Action for U.S. Appl. No. 13/094,572 mailed Jan. 18, 2013, 17 pages.
Tanji et al., "Optical Fiber Cabling Technologies for Flexible Access Network," Optical Fiber Technology, Academic Press, London, US, vol. 14, No. 3, Jul. 1, 2008, 8 pages.
Non-final Office Action for U.S. Appl. No. 13/479,846 mailed Sep. 13, 2013, 11 pages.
Non-final Office Action for U.S. Appl. No. 10/804,958 mailed Aug. 30, 2013, 11 pages.
Advisory Action for U.S. Appl. No. 13/177,233 mailed Jul. 18, 2013, 3 pages.
Final Office Action for U.S. Appl. No. 13/275,798 mailed Jun. 27, 2013, 10 pages.
Advisory Action for U.S. Appl. No. 10/804,958 mailed Jun. 26, 2014, 4 pages.
Notice of Allowance for U.S. Appl. No. 11/975,440 mailed Apr. 30, 2014, 8 pages.
Final Office Action for U.S. Appl. No. 12/072,187 mailed May 27, 2014, 27 pages.
Non-final Office Action for U.S. Appl. No. 13/089,692 mailed May 5, 2014, 7 pages.
Advisory Action for U.S. Appl. No. 13/479,846 mailed May 8, 2014, 3 pages.
Non-final Office Action for U.S. Appl. No. 13/537,753 mailed Mar. 27, 2014, 7 pages.
Non-final Office Action for U.S. Appl. No. 13/601,245 mailed Mar. 27, 2014, 8 pages.
Final Office Action for U.S. Appl. No. 13/649,377 mailed May 29, 2014, 8 pages.
Non-final Office Action for U.S. Appl. No. 13/089,692 mailed Jan. 13, 2014, 8 pages.
Advisory Action for U.S. Appl. No. 13/613,759 mailed Apr. 7, 2014, 3 pages.
Non-final Office Action for U.S. Appl. No. 13/649,377 mailed Jan. 31, 2014, 5 pages.
International Search Report for PCT/US2011/030446 mailed Jul. 14, 2011, 3 pages.
International Search Report for PCT/US2011/030448 mailed Jul. 20, 2011, 5 pages.
International Search Report for PCT/US2011/030466 mailed Aug. 5, 2011, 4 pages.
Final Office Action for U.S. Appl. No. 10/804,958 mailed Mar. 11, 2014, 13 pages.
Notice of Allowance for U.S. Appl. No. 11/975,440 mailed Jan. 15, 2014, 7 pages.
Non-final Office Action for U.S. Appl. No. 12/072,187 mailed Dec. 26, 2013, 25 pages.
Non-final Office Action for U.S. Appl. No. 13/094,572 mailed Mar. 4, 2014, 14 pages.
Final Office Action for U.S. Appl. No. 13/479,846 mailed Feb. 14, 2014, 11 pages.
Final Office Action for U.S. Appl. No. 13/613,759 mailed Jan. 27, 2014, 13 pages.
Final Office Action for U.S. Appl. No. 13/089,692 mailed Aug. 13, 2014, 8 pages.
Notice of Allowance and Interview Summary for U.S. Appl. No. 13/094,572 mailed Aug. 7, 2014, 11 pages.
Examiner's Answer to the Appeal Brief for U.S. Appl. No. 13/275,798 mailed Aug. 26, 2014, 6 pages.
Notice of Allowance for U.S. Appl. No. 13/537,753 mailed Aug. 21, 2014, 7 pages.
Examiner's Answer to the Appeal Brief for U.S. Appl. No. 13/613,759 mailed Aug. 18, 2014, 6 pages.
Advisory Action for U.S. Appl. No. 13/089,692 mailed Oct. 22, 2014, 2 pages.
Non-final Office Action for U.S. Appl. No. 14/093,636 mailed Oct. 10, 2014, 6 pages.
Non-final Office Action for U.S. Appl. No. 13/275,842 mailed Nov. 13, 2013, 7 pages.
Final Office Action for U.S. Appl. No. 13/275,842 mailed Aug. 28, 2014, 20 pages.
Examiner's Answer to the Appeal Brief for U.S. Appl. No. 12/072,187 mailed Dec. 19, 2014, 25 pages.
Non-Final Office Action for U.S. Appl. No. 13/362,474 mailed Dec. 5, 2014, 8 pages.
Non-Final Office Action for U.S. Appl. No. 13/089,692 mailed Dec. 2, 2014, 7 pages.
Notice of Allowance for U.S. Appl. No. 13/537,753 mailed Dec. 12, 2014, 7 pages.
Advisory Action for U.S. Appl. No. 13/275,842 mailed Nov. 20, 2014, 3 pages.
Non-Final Office Action for U.S. Appl. No. 13/648,811 mailed Oct. 24, 2014, 10 pages.
Examiners Answer to the Appeal Brief for U.S. Appl. No. 10/804,958 mailed Mar. 6, 2015, 8 pages.
Decision on Appeal for U.S. Appl. No. 12/323,385 mailed Apr. 1, 2015, 6 pages.
Final Office Action for U.S. Appl. No. 13/089,692 mailed Mar. 12, 2015, 7 pages.
Non-final Office Action for U.S. Appl. No. 13/410,936 mailed Jan. 26, 2015, 13 pages.
Non-final Office Action for U.S. Appl. No. 13/479,846 mailed Mar. 19, 2015, 14 pages.
International Search Report for PCT/US2008/006798 mailed Oct. 1, 2008, 2 pages.

(56) References Cited

OTHER PUBLICATIONS

International Search Report for PCT/US2013/028493 mailed Jun. 24, 2013, 9 pages.
International Preliminary Report on Patentability for PCT/US2013/028493 mailed Sep. 12, 2014, 7 pages.
International Search Report for PCT/US2013/038843 mailed Jul. 18, 2013, 4 pages.
International Preliminary Report on Patentability for PCT/US2013/038843 mailed Nov. 13, 2014, 10 pages.
Author Unknown, "DECT: The standard explained," DECT Forum, Feb. 1997, Solothurn, Switzerland, 16 pages.
Tekmar Sistemi s.r.l., "Definition of Wideband Distribution Systems," R4-020721, TSG-RAN Working Group 4 (Radio), meeting #23, Gyeongju, Korea, May 13-17, 2002, 12 pages.
Lin, Yu-Min et al., "Next-Generation OFDMA-Based Passive Optical Network Architecture Supporting Radio-Over-Fiber," IEEE Journal on Selected Areas in Communications, vol. 28, No. 6, Aug. 2010, IEEE, pp. 791-799.
Koonen, T., "Fiber to the Home/Fiber to the Premises: What, Where, and When?" Proceedings of the IEEE, vol. 94, No. 5, May 2006, IEEE, pp. 911-934.
Author Unknown, "Wireless bridge takes high-speed communications to 'last mile'," Sify International News, Feb. 28, 2012, Sify Technologies Ltd., 4 pages.
Yoshie, T. et al., "Advanced Wireless IP Access System (WIPAS) for Fixed Wireless Access (FWA)—Broadband Access System for triple play services by 'Fiber+Radio'", Proceedings of the 19th Annual IEEE International Symposium on Personal, Indoor, and Mobile Radio Communications, Sep. 15-18, 2008, Cannes, France, IEEE, 5 pages.
Kimura, Y. et al., "A Low-Cost and Very Compact Wireless Terminal Integrated on the Back of a Waveguide Planar Array for 26 GHz Band Fixed Wireless Access (FWA) Systems," IEEE Transactions on Antennas and Propagation, vol. 53, No. 8, Aug. 2005, pp. 2456-2463.
Webb, W., "Broadband Fixed Wireless Access as a Key Component of the Future Integrated Communications Environment," IEEE Communications Magazine, vol. 39, No. 9, Sep. 2001, IEEE, pp. 115-121.
Chien et al., "Optical Millimeter-Wave Generation and Transmission Without Carrier Suppression for Single- and Multi-Band Wireless Over Fiber Applications," Journal of Lightwave Technology, vol. 28, No. 16, Aug. 15, 2010, pp. 2230-2237.
Mohamed et al., "Millimeter-Wave Carrier Generation System for Radio over Fiber," International Symposium on High Capacity Optical Networks and Enabling Technologies, Nov. 18-20, 2008, Penang, Malaysia, IEEE, pp. 111-115.
Parker et al., "Radio-over-fibre technologies arising from the Building the future Optical Network in Europe (BONE) project," www.ietdl.org, IET Optoelectronics, 2010, vol. 4, Issue 6, pp. 247-259.
Rappaport et al., "State of the Art in 60-GHz Integrated Circuits and Systems for Wireless Communications," Proceedings of the IEEE, vol. 99, No. 8, Aug. 2011, pp. 1390-1436.
Singh et al., "Distributed coordination with deaf neighbors: efficient medium access for 60 GHz mesh networks," IEEE INFOCOM 2010 proceedings, 9 pages.
European Search Report for Application No. 08877225.6, Dec. 17, 2014, 5 pages.
Chinese Office Action for Application No. 200880131932.2, Jul. 28, 2014, 27 pages.
Advisory Action for U.S. Appl. No. 13/410,936 mailed Sep. 17, 2015, 3 pages.
Notice of Allowance and Applicant-Initiated Interview Summary for U.S. Appl. No. 14/300,541 mailed Aug. 28, 2015, 10 pages.
Non-final Office Action for U.S. Appl. No. 13/873,927 mailed Aug. 14, 2015, 19 pages.
Examination Report for European Patent Application No. 13726908.0, mailed Sep. 9, 2015, 6 pages.
Notice of Allowance for U.S. Appl. No. 12/323,385 mailed Jul. 24, 2015, 8 pages.
Final Office Action for U.S. Appl. No. 13/410,936 mailed Jul. 22, 2015, 19 pages.
Final Office Action for U.S. Appl. No. 14/093,636 mailed May 22, 2015, 9 pages.
Non-final Office Action for U.S. Appl. No. 14/300,541 mailed May 6, 2015, 8 pages.
Non-final Office Action for U.S. Appl. No. 13/275,842 mailed Apr. 28, 2015, 21 pages.
Final Office Action for U.S. Appl. No. 13/648,811 mailed Jun. 9, 2015, 19 pages.
Non-final Office Action for U.S. Appl. No. 13/089,692 mailed Jan. 14, 2016, 8 pages.
Final Office Action for U.S. Appl. No. 13/479,846 mailed Jan. 4, 2016, 15 pages.
Final Office Action for U.S. Appl. No. 13/275,842 mailed Nov. 13, 2015, 24 pages.
Non-final Office Action for U.S. Appl. No. 14/947,187 mailed Feb. 2, 2016, 12 pages.
Final Office Action for U.S. Appl. No. 13/873,927 mailed Feb. 8, 2016, 24 pages.

\* cited by examiner

US 9,323,020 B2

FIBER OPTIC TERMINAL HAVING ADAPTER PANEL SUPPORTING BOTH INPUT AND OUTPUT FIBERS FROM AN OPTICAL SPLITTER

PRIORITY APPLICATION

This application is a continuation of International Application No. PCT/CN08/072625, filed Oct. 9, 2008, the entire contents of which are hereby incorporated by reference.

BACKGROUND

1. Technical Field

The field of the disclosure relates to fiber optic terminals. The fiber optic terminals can include, but are not limited to local convergence points (LCPs) and fiber distribution terminals (FDTs).

2. Technical Background

To provide improved performance to subscribers, communication and data networks are increasingly employing optical fiber. The benefits of optical fiber are well known and include higher signal-to-noise ratios and increased bandwidth. To further improve performance, fiber optic networks are increasingly providing optical fiber connectivity all the way to end subscribers. These initiatives include various fiber-to-the-premises (FTTP), fiber-to-the-home (FTTH), and other fiber initiatives (generally described as FTTx). In this regard, FIG. 1 illustrates an exemplary fiber optic network 10. The fiber optic network 10 provides optical signals from switching points 12 over a distribution network 13 comprised of fiber optic feeder cables 14. The optical signals may be carried over the fiber optic feeder cables 14 to local convergence points (LCPs) 16. The LCPs 16 act as consolidation points for splicing, making cross-connections and interconnections, as well as providing locations for couplers and splitters. Fiber optic cables 18, such as distribution cables, exit the LCPs 16 to carry optical signals between the fiber optic network 10 and a subscriber's premises 20. Typical subscriber premises 20 include single-dwelling units (SDU), multi-dwelling units (MDU), businesses, and/or other facilities or buildings.

Because LCPs 16 are typically configured to service multiple premises 20, the fiber optic cables 18 leaving the LCPs 16 are typically run to one or more intermediate fiber distribution terminals (FDTs) 22. FDTs 22 facilitate FTTx applications by providing network access points to the fiber optic network 10 to groupings of subscribers' premises 20. Optical interconnections to the subscribers' premises 20 are typically provided via indoor/outdoor drop cables 24 that are optically interconnected with the fiber optic cables 18 within the FDTs 22. The FDTs 22 also provide a consolidated location for technicians or other installation personnel to make and protect splices between the drop cables 24 and the fiber optic cables 18 as opposed to making splices in sporadic locations.

In either case of LCPs or FDTs, size of the terminal can be a factor. Size is particularly a factor for MDU applications, where available real estate for locating LCPs and/or FDTs may be limited. LCPs and FDTs must be sized to handle the number of subscribers to be serviced. This presents particular challenges for providing high-density LCPs and FDTs that have enough internal space available to include necessary optical interconnection components. For example, if an LCP provides three (3) 1×32 splitters for handling up to ninety-six (96) subscribers, space must be provided in the LCP for three (3) network-side ports, three (3) splitters, fusion or mechanical splices, and ninety-six (96) subscriber-side connections/connectors, as well as any other components required. Similarly, if an FDT is configured to provide access to forty-eight (48) subscribers, space must be provided in the FDT for forty-eight (48) subscriber-side connections/connectors, as well as any other components required. Further, routing guides must also be provided for routing network-side and subscriber-side fibers without damaging the optical fibers.

Even after optical connections are made, the LCPs and FDTs should be flexible enough to allow for removing and adding new subscribers. When adding new subscribers, additional subscriber-side connections may need to be established within an LCP and/or FDT. This can be particularly challenging in high density LCPs and FDTs, because adding new connections may special handling that can risk damaging fibers for established connections or require reconfiguring established connections to access new connections thereby disrupting service to established connections. This is because new connections and related areas may be difficult to access with existing high density optical connections established in a terminal.

SUMMARY OF THE DETAILED DESCRIPTION

Embodiments disclosed in the detailed description include fiber optic terminals configured to optically connect a received network-side fiber to one or more of a plurality of received subscriber-side fibers. In this regard, the fiber optic terminal includes at least one adapter module comprising at least one adapter panel. The adapter panel is configured to receive both an input fiber and one or more of a plurality of output fibers from an optical splitter. To establish optical connections between the network-side fiber and one or more of the subscriber-side fibers, the input fiber from the optical splitter is optically connected to an input fiber optic adapter on the adapter panel. The input fiber optic adapter is configured to be optically connected to the network-side fiber. One or more of the plurality of output fibers from the optical splitter are optically connected to one or more output fiber optic adapters on the adapter panel. The output fiber optic adapters are configured to be optically connected to one or more of the subscriber-side fibers. In this manner, optical connections between the network-side fiber and one or more of the plurality of subscriber-side fibers can be made and accessed through a common adapter panel in the fiber optic terminal. The fiber optic terminals can be employed to facilitate providing direct or intermediate optical connections between a fiber optic network and end subscribers.

The fiber optic terminals disclosed herein may be used for any type of fiber optic terminal, including but not limited to local convergence points (LCPs) and fiber distribution terminals (FDTs). The fiber optic terminals disclosed herein may be used for any fiber optic distribution application, including but not limited to directly or intermediately routing fiber optic cables and optical fibers from a fiber optic network(s) to end subscribers. This includes, but is not limited to various fiber-to-the-premises (FTTP), fiber-to-the-home (FTTH), and other fiber initiatives (generally described as FTTx). Subscriber premises include, but are not limited to single-dwelling units (SDU), multi-dwelling units (MDU), businesses, and/or other facilities or buildings.

Additional features and advantages of the invention will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description of embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operation of the invention.

DETAILED DESCRIPTION

Reference will now be made in detail to the preferred embodiments of the present invention, examples of which are illustrated in the accompanying drawings. Whenever possible, like reference numbers will be used to refer to like components or parts.

Embodiments disclosed in the detailed description include fiber optic terminals configured to optically connect a received network-side fiber to one or more of a plurality of received subscriber-side fibers. In this regard, the fiber optic terminal includes at least one adapter module comprising at least one adapter panel. The adapter panel is configured to receive both an input fiber and one or more of a plurality of output fibers from an optical splitter. To establish optical connections between the network-side fiber and one or more of the subscriber-side fibers, the input fiber from the optical splitter is optically connected to an input fiber optic adapter on the adapter panel. The input fiber optic adapter is configured to be optically connected to the network-side fiber. One or more of the plurality of output fibers from the optical splitter are optically connected to one or more output fiber optic adapters on the adapter panel. The output fiber optic adapters are configured to be optically connected to one or more of the subscriber-side fibers. In this manner, optical connections between the network-side fiber and one or more of the plurality of subscriber-side fibers can be made and accessed through a common adapter panel in the fiber optic terminal. The fiber optic terminals can be employed to facilitate providing direct or intermediate optical connections between a fiber optic network and end subscribers.

The fiber optic terminals disclosed herein may be used for any type of fiber optic terminal, including but not limited to local convergence points (LCPs) and fiber distribution terminals (FDTs). For example, if the fiber optic terminal is configured as a local convergence point (LCP), the network-side or upstream cable may be a feeder cable from a central office or switching point. The subscriber-side or downstream cable may be a distribution cable. If the fiber optic terminal is configured as a fiber distribution terminal (FDT), the network-side or upstream cable may be a distribution cable, and a subscriber-side or downstream cable may be a drop cable. The drop cable may then be routed to an end subscriber(s) for FTTx applications.

Figure 1:
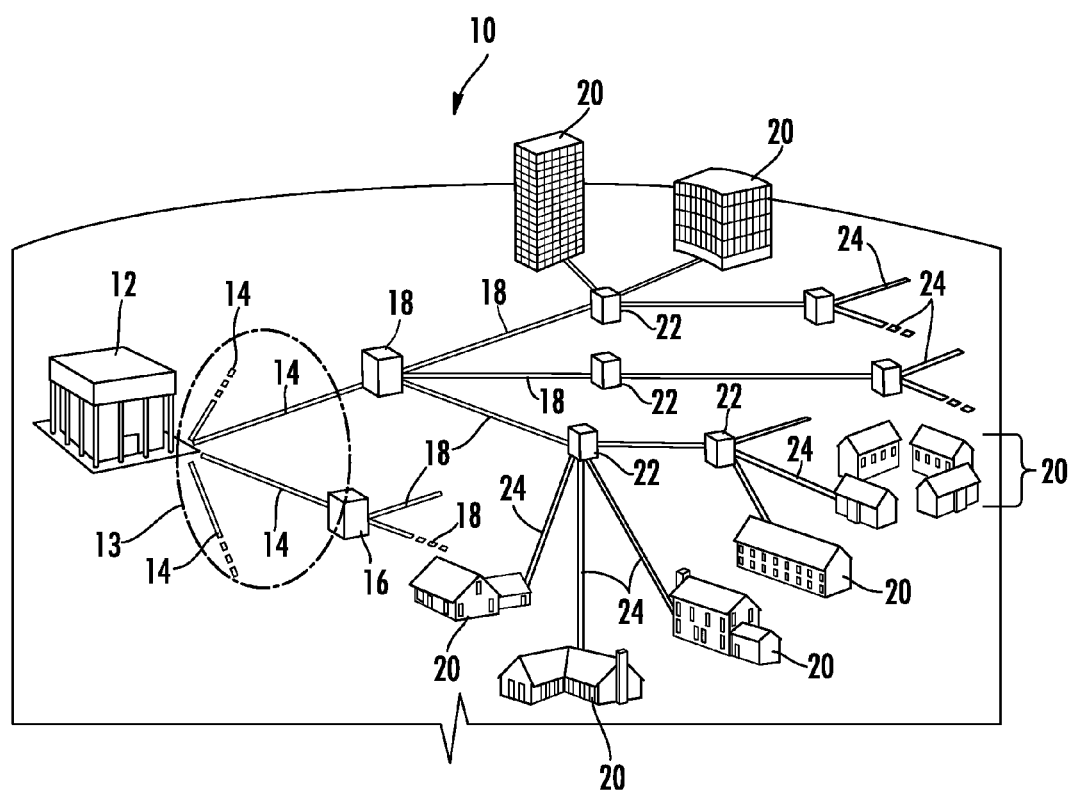
FIG. 1 is a schematic illustration of an exemplary fiber optic network which includes fiber optic terminals for carrying optical signals over the fiber optic network.
Figure 2:
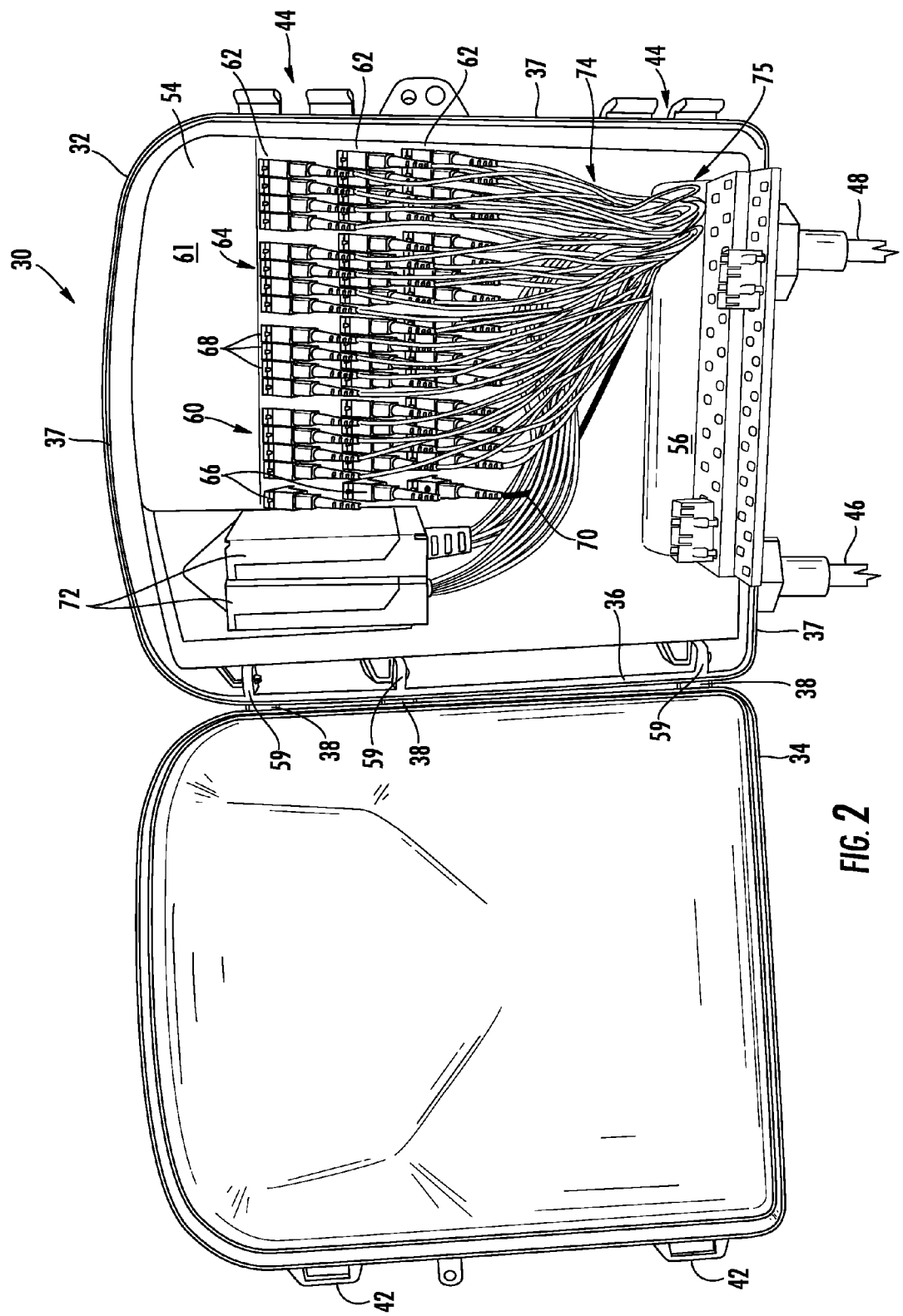
FIG. 2 is an exemplary fiber optic terminal with established optical fiber connections according to one embodiment.

Referring to FIG. 2, a fiber optic terminal 30 constructed in accordance with one embodiment of the invention is shown. The fiber optic terminal 30 provides a convenient access point in a telecommunications or data network for a field technician to install and reconfigure optical fiber connections between network-side and subscriber-side fiber optic cables. The fiber optic terminal 30 is configured to allow one or more optical fibers provided in one or more network-side or upstream fiber cables to be easily and readily interconnected with one or more optical fibers in one or more subscriber-side or downstream fiber cables. By the term "subscriber-side," it is meant that optical fiber, fiber optic cable, or optical connection, as the case may be, is provided anywhere between the end subscriber and the fiber optic terminal 30. A subscriber-side fiber cable, optical fiber, or optical connection may be provided directly to an end subscriber or may be provided to one or more intermediate optical terminals or components before reaching an end subscriber. By the term "network-side," it is meant that the optical fiber, fiber optic cable, or optical connection, as the case may be, is provided between a fiber optic network, central switching point, central office, or the like and the fiber optic terminal 30.

Figure 3:
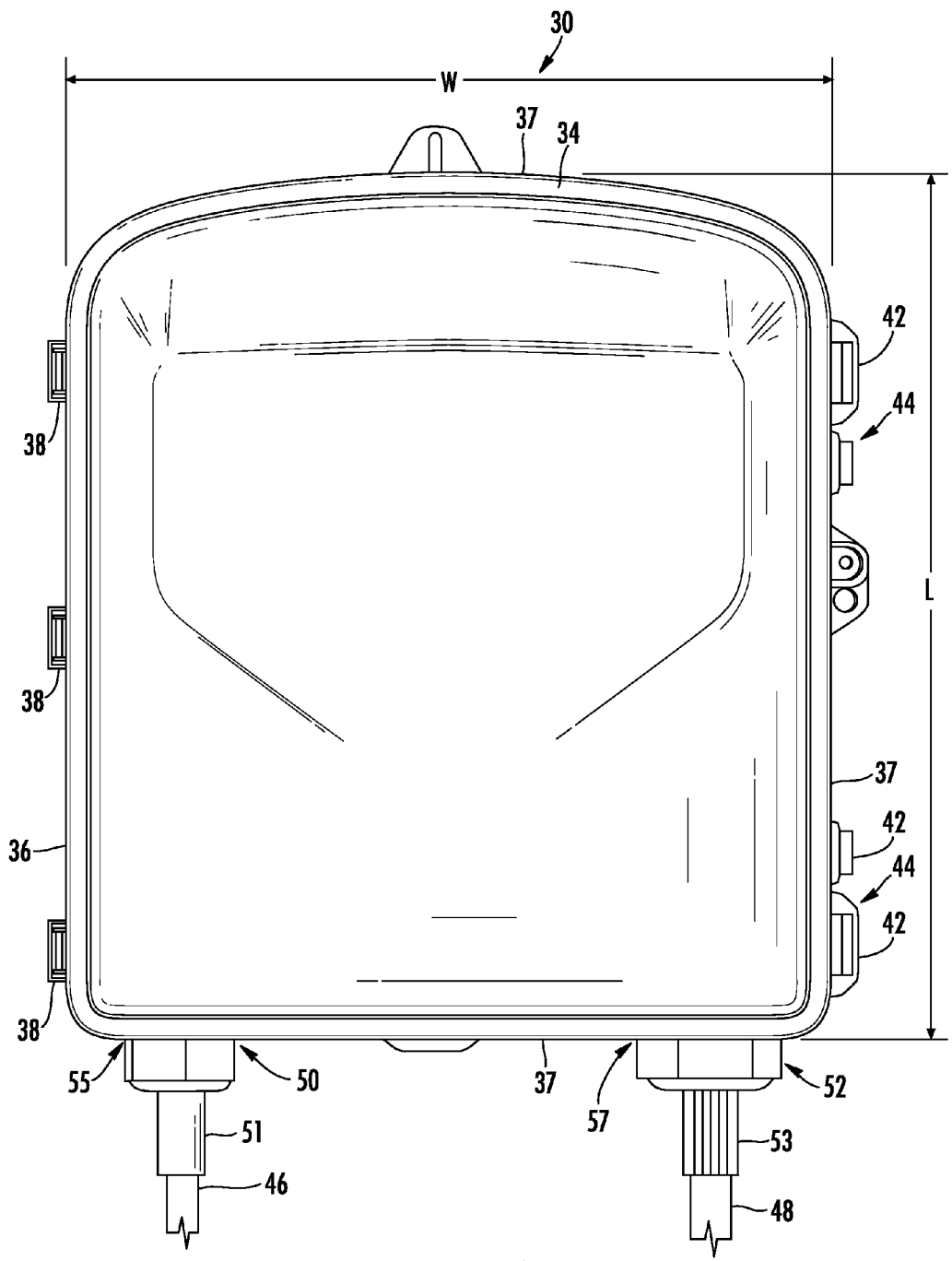
FIG. 3 illustrates the fiber optic terminal of FIG. 2 with a cover closed on a base of the fiber optic terminal.

The fiber optic terminal 30 illustrated in FIG. 2 comprises a base 32 and a cover 34 hingedly affixed to the base 32 and opened thereon. The base 32 and cover 34 may be made of a rigid material, such as aluminum, plastic, or thermoplastic, such that the internal components of the fiber optic terminal 30 can be protected when the cover 34 is closed on the base 32, as illustrated in FIG. 3. Turning back to FIG. 2, the cover 34 is generally rectangular and is hingedly affixed to the base 32 of similar form along the upper edge of a left side wall 36 at one or more hinge locations 38. The base 32 is comprised of three other side walls 37 that are either attached or interconnected to each other and the left side wall 36 to form an interior cavity 40 within the base 32 (see FIG. 4). The interior cavity 40 provides room for routing the network-side and subscriber-side cables and the optical fibers therein and making optical interconnections between the two, including through any intermediate optical components that may be provided in the fiber optic terminal 30, such as splice trays, coupler trays, and adapters as examples, as well be described in more detail below.

A technician opens the cover 34 to access the interior cavity 40 to install or reconfigure optical interconnections within the fiber optic terminal 30. After completion, the cover 34 can be closed against the base 32 to close the fiber optic terminal 30. The cover 34 and the base 32 contain one or more clasps 42, 44 that interlock with each other when the cover 34 is closed on the base 32 as a means of securing the cover 34 to the base 32. When the cover 34 is closed, the optical interconnections and components contained inside the fiber optic terminal 30 are protected from the environment. When closed, the fiber optic terminal 30 has the approximate dimensions of 14.95 inches length ("L"), 14.60 inches width ("W"), and 5.65 inches height ("H") (see FIGS. 3 and 5). However, any dimensions desired are possible.

As will be discussed in more detail herein, the fiber optic terminal 30 and its internal components facilitate making optical connections between optical fiber(s) provided by a network-side cable 46 and a subscriber-side cable 48. Both may be distribution cables. The fiber optic terminal 30 may be particularly suited for high volume/density optical connections. The network-side cable 46 provides one or more optical fibers configured to be optically connected to a fiber optic network for carrying optical signals to and from the fiber optic network. The subscriber-side cable 48 also contains one or more optical fibers, but the one or more optical fibers are configured to be run towards the end subscribers either directly, or through one or more intermediate terminals and/or other optical components. Thus, when an optical fiber(s) provided in the network-side cable 46 is optically connected to an optical fiber(s) provided in the subscriber-side cable 48, an optical connection can be established between an end subscriber and a fiber optic network.

Figure 4:
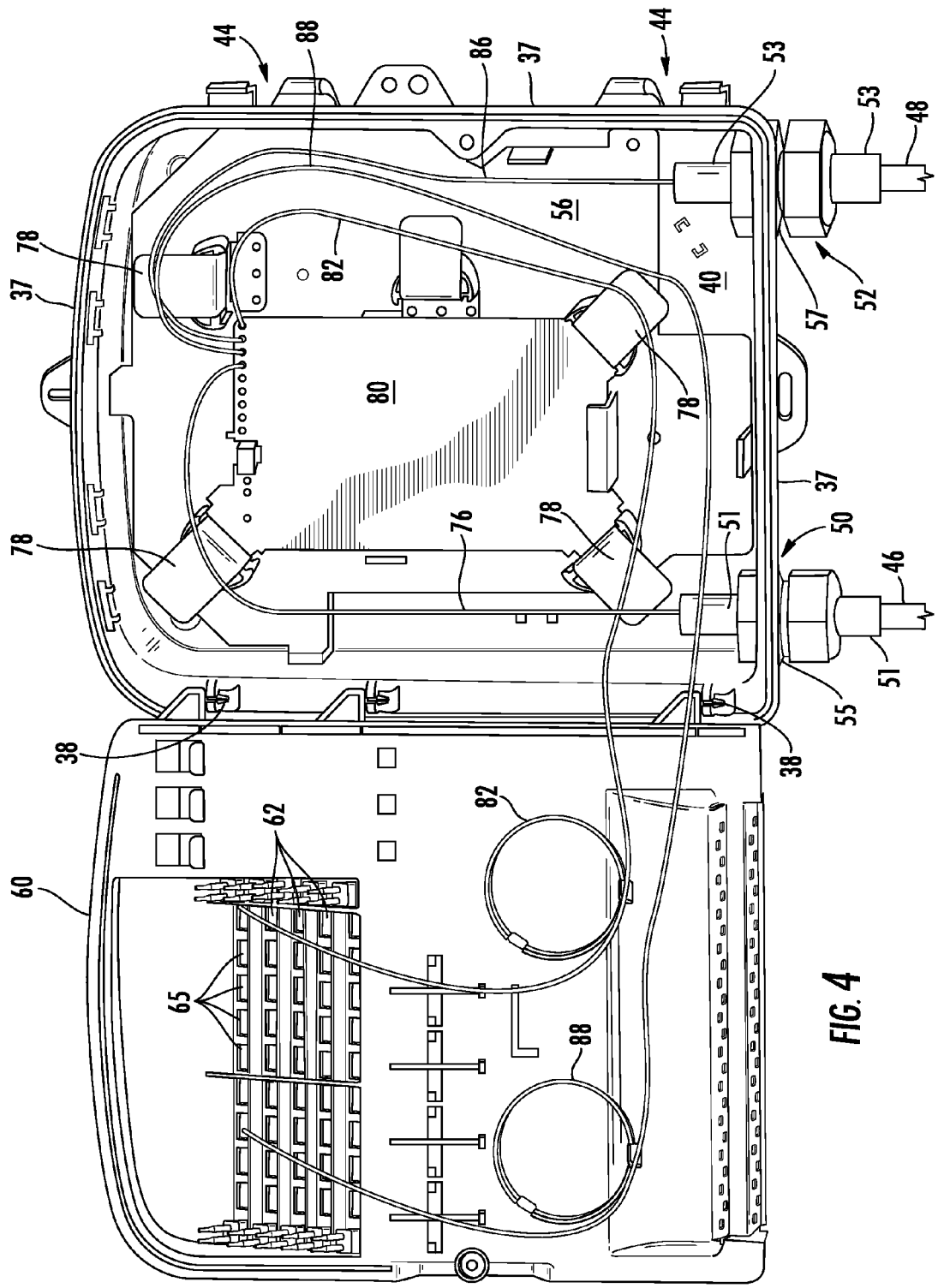
FIG. 4 illustrates the fiber optic terminal of FIG. 2 with a transition panel opened with a lower fiber management area of the fiber optic terminal exposed.

As illustrated in FIGS. 2 and 4, the fiber optic terminal 30 is mounted on a network-side cable 46 and a subscriber-side cable 48 via respective cable port assemblies 50, 52 provided in the base 32. Each port assembly 50, 52 is comprised of a transport tube 51, 53 coupled to ports 55, 57 provided in the base 32 and configured to receive the network-side cable 46 and the subscriber-side cable 48, respectively. The transport tubes 51, 53 may provide strain relief to the network-side cable 46 and a subscriber-side cable 48. Although only one network-side cable 46 and subscriber-side cable 48 are illustrated, note that the fiber optic terminal 30 could be provided with multiple ports to accept and provide optical connections between multiple network-side cables 46 and/or subscriber-side cables 48. The cable port assemblies 50, 52 in the fiber optic terminal 30 facilitate receipt and routing of the network-side cable 46 and the subscriber-side cable 48 behind a transition panel 54 disposed within the interior cavity 40. The transition panel 54 is comprised of a front side 61 and a rear side 63 and is configured to divide the interior cavity 40 into a lower fiber management area 56 and an upper fiber management area 58 (see FIG. 5). The lower fiber management area 56 is located on the rear side 63 of the transition panel 54 in the illustration of the fiber optic terminal 30. The upper fiber management area 58 is located on the front side 61 of the transition panel 54 in the illustration of the fiber optic terminal 30.

Although the transition panel 54 is illustrated in the stowed position in FIG. 2, the transition panel 54 is rotatable relative to the base 32 through an angle of approximately one hundred and ten (110) degrees between the stowed position and the deployed position, although any degree of rotation can be provided. The transition panel 54 is generally rectangular and is hingedly affixed to the base 32 along the upper edge of the side wall 36 at one or more hinge locations 59 as shown in FIG. 2. The hinge locations 59 are located on the same side wall 36 as the one or more hinge locations 38 that hingedly affix the cover 34 to the base 32 in this embodiment. However, the hinge locations 59 may be located on the opposite side wall 36 as the hinge locations 38. Alternatively, the transition panel 54 may be slidably attached to the base 32 to selectively expose portions of the interior cavity 40 of the base 32, or may be removably attached to the base 32 to provide unobstructed access to the interior cavity 40. Any configuration is possible as long as there is sufficient space provided in the upper fiber management area 58 to route the transport tubes 51, 53 of the network-side cable 46 and the subscriber-side cable 48 between the cable port assemblies 50, 52 and the transition panel 54. Although not shown, the base 32 and/or the transition panel 54 may be provided with conventional means for securing the transition panel 54 to the base 32 in the closed configuration. Furthermore, the base 32 and/or transition panel 54 may be provided with conventional means for retaining the transition panel 54 in the opened configuration. If necessary, the transition panel 54 may also be provided with lengthwise and/or widthwise stiffening ribs to strengthen and prevent distortion of the transition panel 54.

In this embodiment of the fiber optic terminal 30, the cable port assemblies 50, 52 are provided in the base 32 such that the network-side cable 46 and the subscriber-side cable 48 are routed into the lower fiber management area 56. The transition panel 54 is movable relative to the base 32 to expose the lower fiber management area 56 to a field technician initially installing the fiber optic terminal 30 or subsequently reconfiguring the optical fiber connections within the fiber optic terminal 30. There, the cable jackets of the network-side cable 46 and the subscriber-side cable 48 can be stripped away to expose the one or more optical fibers carried therein for preparing optical interconnections within the fiber optic terminal 30. Optical interconnections may include splicing the optical fibers carried in the network-side cable 46 and subscriber-side cable 48 as will be discussed below in more detail.

As will be described herein, eventually, one or more network fibers from the network-side cable 46 and one or more fibers from the subscriber-side cable 48 are optically connected to each other via an adapter module 60. An adapter module is a module that contains or supports a plurality of fiber optic adapters. The adapter module 60 may be integrally formed as part of a mold of a transition panel or provided as a separate module which may be attached to a transition panel. More than one adapter module 60 may be provided, but the fiber optic terminal 30 illustrated in FIG. 2 contains one adapter module 60. The adapter module 60 contains one or more adapter panels 62. An adapter panel 62 is a panel that is configured to support a plurality of fiber optic adapters 64. The fiber optic adapters 64 support making optical connections between one or more network fibers from the network-side cable 46 and one or more fibers from the subscriber-side cable 48. In this embodiment, each adapter panel 62 contains at least one input fiber optic adapter 66 and at least one output fiber optic adapter 68. In the fiber optic terminal 30 of FIG. 2, one input fiber optic adapter 66 and sixteen (16) output fiber optic adapters 68 are illustrated as being supported by each adapter panel 62. Behind the transition panel 54 in the lower fiber management area 56, as will be described in more detail below, one or more fibers from the network-side cable 46 will be exposed, spliced, and optically connected to one or more input fiber optic adapters 66. One or more fibers from the subscriber-side cable 48 will also be exposed, spliced, and optically connected to one or more output fiber optic adapters 68. One fiber can be connected to each fiber optic adapter 66, 68 provided in the adapter module 60.

To make an optical connection between one or more network fibers from the network-side cable 46 and one or more fibers from the subscriber-side cable 38, an input fiber 70 is provided that is connectorized on one end and connected to an input fiber optic adapter 66 to optically connect the input fiber 70 to a fiber provided by the network-side cable 46. The other end of the input fiber 70 is input into an optical splitter 72. The optical splitter 72 is configured to split optical signals carried by the input fiber 70, via connection to the input fiber optic adapter 66, into a plurality of connectorized output fibers 74. One or more of the output fibers 74 can then be connected into one or more of the output fiber optic adapters 68 to optically connect fibers in the subscriber-side cable 48 to optical fibers in the network-side cable 46. The adapter panels 62 are configured to provide both input and output fiber optic adapters 66, 68 on the same panel to facilitate ease in initially installing or reconfiguring optical connections. Further, any fiber optic adapter and number of same can be configured as either input or output fiber optic adapters 66, 68 to provide flexibility when installing or reconfiguring optical connections. A fiber park area 75 is provided in the upper fiber management area 56 to provide room for the output fibers 74 to be located or parked when not connected to the output fiber optic adapters 68 and optical splitter(s) 72, if provided The fiber optic adapters 66, 68 are LC adapters in the embodiment of FIG. 2, but may be of any connection type, including but not limited to SC, LC, MTP, FC, ST, MU, or MTRJ. Also, as illustrated in FIG. 2, the fiber optic terminal 30 is configured for forty-eight (48) subscribers, whereby several input fibers may be split into sixteen (16) fibers. Two optical splitters 72 are provided in this regard in the fiber optic terminal 30, since each optical splitter 72 provided therein can optically split optical signals carried by the input fiber 70 into sixteen (16) output fibers. Note however that any splitting configuration is possible to be provided by the fiber optic terminal 30, including providing one or more than two optical splitters 72. Other splitter configuration examples include, without limitation, 1×32, 1×16 and 1×8. The splitter configuration depends on factors such as the number of network-side cables 46, the number of subscriber-side cables 48, the available space in the upper fiber management area 58, and the connector type for the fiber optic adapters 66, 68. For example, for SC connector types, the fiber optic terminal 30 may accommodate one (1) 1×32 optical splitter for a total of thirty-two (32) output fibers 74, three (3) 1×16 optical splitters or six (6) 1×8 optical splitters for a total of forty-eight (48) output fibers 74. LC connector types may accommodate three (3) 1×32 optical splitters, six (6) 1×16 optical splitters, or twelve (12) 1×8 optical splitters for a total of ninety-six (96) output fibers 74.

FIG. 2 illustrates the fiber optic terminal 30 with exemplary finalized optical connections made on the adapter module 60. The components and aspects of the fiber optic terminal 30 to route optical fibers from the network-side cable 46 and the subscriber-based cable 48 to optically connect optical fibers provided therein to the input and output fiber optic adapters 66, 68, respectively, will now be described. FIG. 4 illustrates the fiber optic terminal 30 of FIG. 2 with the transition panel 54 opened showing the lower fiber management area 56 to show exemplary routing and connections that may be provided for optical fiber(s) from the network-side cable 46 and the subscriber-side cable 48 to the fiber optic adapters 66, 68. As previously discussed and illustrated in FIG. 2, providing optical fiber(s) from the network-side cable 46 and the subscriber-based cable 48 to the fiber optic adapters 66, 68 supplied by adapter panel(s) 62 facilitates making optical connections in the upper fiber management area 58 of the fiber optic terminal 30, as previously discussed and illustrated in FIG. 2.

In order to assist or prevent a technician from incorrectly installing an input fiber 70 into an output fiber optic adapter 68, and/or an output fiber 74 into an input fiber optic adapter 66, the input fiber 70 and/or output fibers 74 from the optical splitter 72 in the fiber optic terminal 10 may be marked. Such may be marked by cable jackets or sleeves of different colors or other visual markings, such as lines, symbols, etc. For example, as illustrated in FIG. 2, the input fiber 70 is marked by being solid, which could be indicative of any type of marking, coloring, or other visual indicator. Also, as illustrated in FIG. 2, the input fiber optic adapter 66 can also be marked in lieu of or in addition to marking of the input fiber 70. The marking on the fiber optic adapter 66 is illustrated as a dot, but can be any other type of marking. Other or similar marking may also be provided on the output fibers 74 and/or the output fiber optic adapters 68 in the same or similar regard to allow a technician to distinguish input fibers 70 from output fibers 74 and/or input fiber optic adapters 66 from output fiber optic adapters 68. Further, the fiber optic adapters 66, 68 may be shuttered, or the fiber optic adapters 66, 68 keyed with a corresponding matching key provide on the input fiber 70 and/or the output fibers 74 to prevent an input fiber 70 from being connected to an output fiber optic adapter 68 and/or an output fiber 74 from being connected into an input fiber optic adapter 66.

As illustrated in FIG. 4, the transition panel 54 contains one or more openings 65 to support one or more fiber optic adapters 66, 68 as part of the adapter module 60 for supporting optical connections as previously described. One or more network-side fibers 76 are provided in the lower fiber management area 56 in this example. The network-side fiber(s) 76 is an optical fiber from the network-side cable 46. The network-side cable 46 is not shown coming into the lower fiber management area 56, but will typically be done when the fiber optic terminal 30 is installed. A technician will typically strip the cable jacket around the network-side cable 46 run inside the base 32 and into the lower fiber management area 56 to expose the one or more network-side fibers 76. The network-side fiber(s) 76 can be routed through the lower fiber management area 56 through one or more fiber routing guides 78. The fiber routing guides 78 can route the network-side optical fiber(s) 76 and/or provide for slack storage of the network-side optical fiber(s) 76 if needed. The network-side fiber(s) 76 can then connect to a conventional splice tray 80. Inside the splice tray 80, one or more network-side splices or splice holders are provided to splice the network-side optical fiber(s) 76 into one or more input pigtails 82 for each network-side optical fiber 76 in any known manner. Such includes fusion or mechanical splicing. For purposes of clarity, only a representative one of the network-side fibers 76 existing in the splice tray 80 and terminating into an input pigtail 82 is described herein. However, it will be readily apparent and well understood by one of ordinary skill in the art that other network-side optical fibers, if provided, can be spliced into input pigtails and routed in the substantially the same manner.

Figure 5:
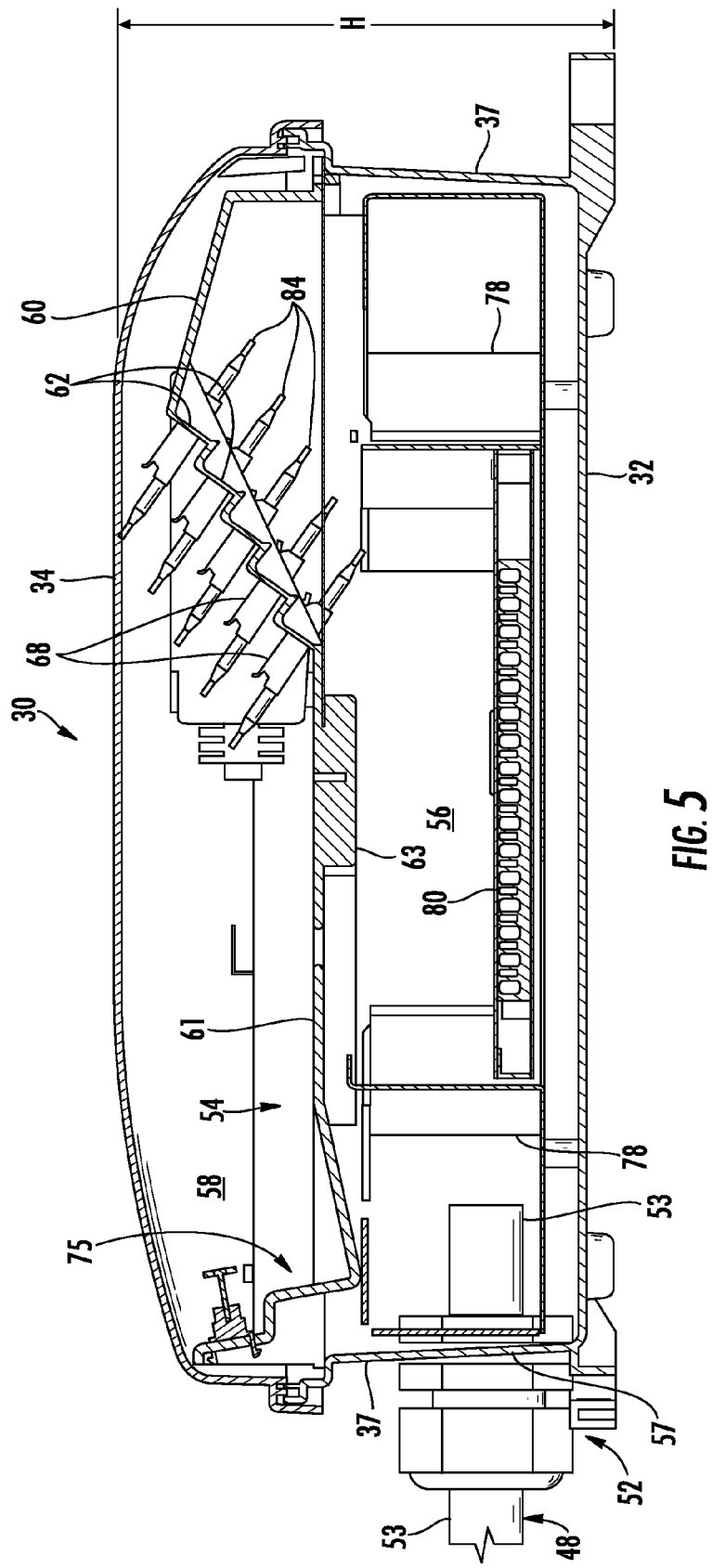
FIG. 5 is a side cross-sectional view of the fiber optic terminal of FIG. 2.

Upon exiting the splice tray 80, the input pigtail 82 can be routed around one or more of the fiber routing guides 78 to the underside of the transition panel 54 to an input fiber optic adapter 66 provided in an adapter panel 62. In this manner, the input pigtail 82 is optically connected to an input fiber optic adapter 66 so as to be accessible in the upper fiber management area 58 for a technician to establish optical connections to the network-side fiber(s) 76 without having to open the transition panel 54 and expose the lower fiber management area 56, if desired. FIG. 5 illustrates a cross-sectional side view of the fiber optic terminal 30 to further illustrate the fiber optic adapters 66, 68 extending through the adapter module 60 to the lower fiber management area 56. As illustrated in this example, the fiber optic adapters 66, 68 are optically connected to corresponding fiber optic adapters 84 provided on the underneath side of the adapter module 60. In this manner, the input pigtail 82 can be connected to any fiber optic adapter 84 desired in the lower fiber management area 56 for a corresponding fiber optic adapter on the adapter module 60 in the upper fiber management area 58 to become an input fiber optic adapter 66. Thus, the adapter module 60 provided in the fiber optic terminal 30 allows for different fiber optic adapters 84 and their corresponding fiber optic adapters 66, 68 to be configured as either an input fiber optic adapter 66 or an output fiber optic adapter 68 depending on whether an input pigtail 82 or fiber from the subscriber-side cable 48 is optically connected to the fiber optic adapter 66, 68. In this embodiment of the fiber optic terminal 10, the pitch between the rows of fiber optic adapters 84 is approximately 0.62 inches and the pitch between fiber optic adapters 84 is about 0.75 inches.

Once the input pigtail 82 is routed and optically connected to an input fiber optic adapter 66, an optical connection can be established to the network-side fiber(s) 76 provided by network-side cable 46 by connecting a fiber to the input fiber optic adapter 66. Next, the routing of one or more fibers provided by the subscriber-side cable 48 are discussed to establish optical connections to one or more of the output fiber optic adapters 68. Once established, one or more optical fibers between the network-side cable 46 and the subscriber-side cable 48 can be optically connected to each other by coupling input and output fiber optic adapters 66, 68 together.

Turning back to FIG. 4, one or more subscriber-side fibers 86 is provided in the lower fiber management area 56. The subscriber-side fiber(s) 86 is an optical fiber from the subscriber-side cable 48. The subscriber-side cable 48 is not shown coming into the lower fiber management area 56, but will typically be done when the fiber optic terminal 30 is installed. A technician will typically strip the cable jacket around the subscriber-side cable 48 run inside the base 32 and into the lower fiber management area 56 to expose the one or more subscriber-side fibers 86. The subscriber-side fiber(s) 86 can also be routed through the lower fiber management area 56 through the one or more fiber routing guides 78. The fiber routing guides 78 can route the subscriber-side fiber(s) 86 and/or provide for slack storage of the subscriber-side fiber(s) 86 if needed. The subscriber-side fiber(s) 86 are then optically connected to the splice tray 80. Inside the splice tray 80, one or more subscriber-side splices or splice holders are provided to splice the subscriber-side fiber(s) 86 into one or more output pigtails 88 for each subscriber-side fiber 86 in any known manner. Such includes fusion or mechanical splicing. For purposes of clarity, only a representative one of the subscriber-side fibers 86 existing in the splice tray 80 and terminating in an output pigtail 88 is described herein. However, it will be readily apparent and well understood by one of ordinary skill in the art that other subscriber-side fibers, if provided, can be spliced into output pigtails and routed in the substantially the same manner.

Upon exiting the splice tray 80, the output pigtail 88 can be routed around one or more of the fiber routing guides 78 to the underside of the transition panel 54 to an output fiber optic adapter 68. In this manner, the output pigtail 88 is optically connected to an output fiber optic adapter 68 accessible in the upper fiber management area 58 for a technician to establish optical connections to the subscriber-side fiber(s) 76 without having to open the transition panel 54 and expose the lower fiber management area 56, if desired.

At this point, one or more network-side optical fibers 76 from the network-side cable 46 and one or more subscriber-side optical fibers 86 from the subscriber-side cable 48 have been received, routed, spliced into input and output pigtail(s) 82, 88 and connected to fiber optic adapter(s) 84 located in the back side of the transition panel 54 on the same adapter panel 62. When these connections are finalized, a technician can close the transition panel 54 to close off the lower fiber management area 56 and make any optical connections desired in the upper fiber management area 58 via optical connections using a coupling fiber or input and output fibers 70, 74 between the input and output fiber optic adapters 66, 68, respectively, as previously discussed.

Figure 6:
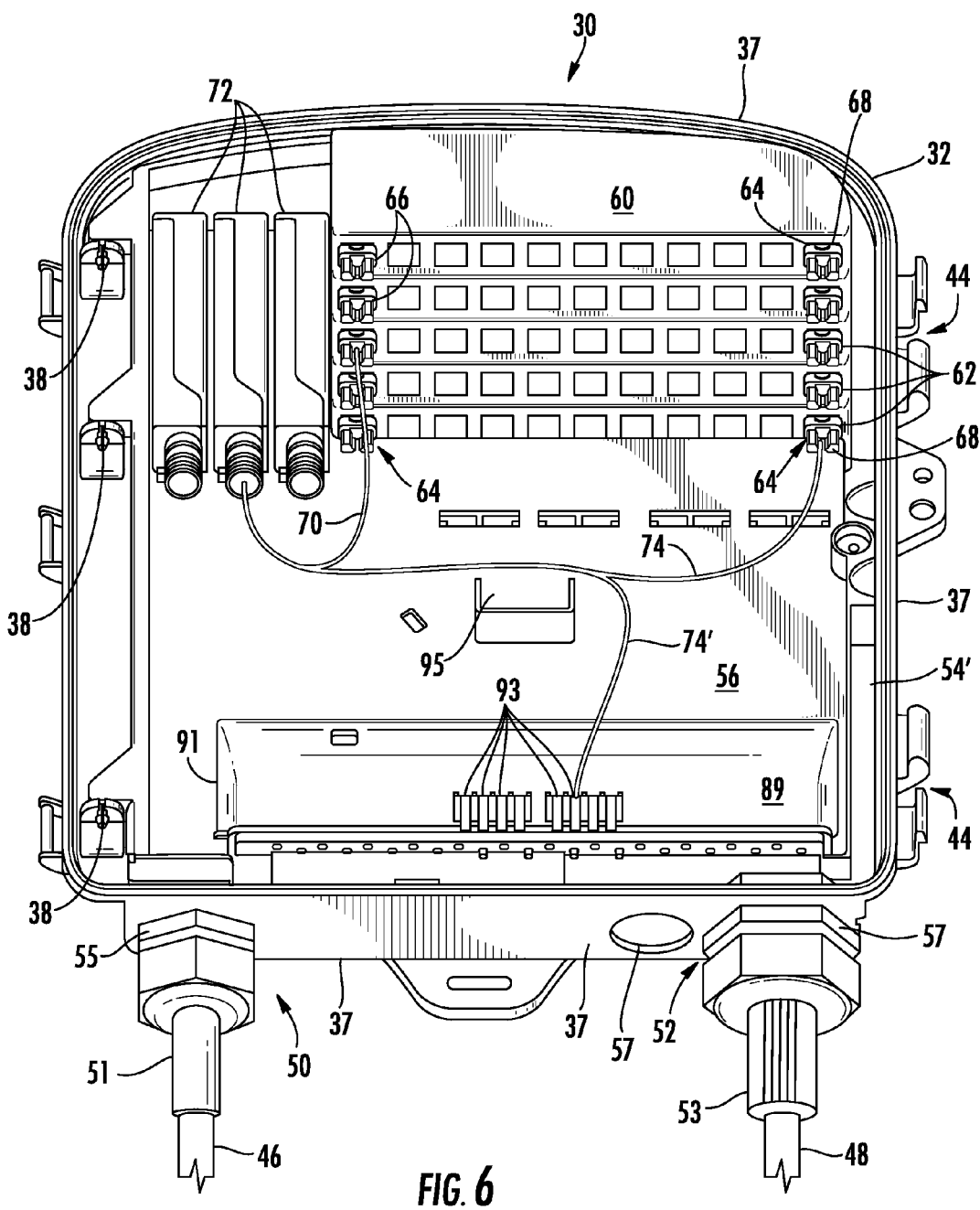
FIG. 6 illustrates an alternative embodiment of a transition panel for the fiber optic terminal of FIG. 2 providing an optical fiber parking area.

Variations of the fiber optic terminal 30 and its components are possible. The components described above in the fiber optic terminal 30 are not limited to inclusion in any particular area or manner, including the upper fiber management area 58 or the lower management area 56. As an example, FIG. 6 illustrates the fiber optic terminal 30 of FIG. 2, but having an alternative optical fiber parking area 89 for unconnected output fibers 74. The optical fiber parking area 89 may be comprised of a protruding portion 91 molded into a transition panel 54' that contains one or more orifices 93. A parked optical fiber 74' can be inserted into an orifice 93 extending through the transition panel 54' into the lower fiber management area 56. If an optical splitter 72 is employed in the fiber optic terminal 30, output fibers 74 for each optical split will typically be provided from the optical splitter 72 even if not connected to output fiber adapters 68 on the adapter module 60. This scenario would exist when an optical fiber is run to an end subscriber, but the subscriber's optical fiber has not yet been connected. In such case, it may be desirable to "park" any unconnected output fibers 74' to prevent them from being damaged when installing or reconfiguring other input and/or output fibers 70, 74. In this regard, as illustrated in FIG. 6, an unconnected output fiber 74' from one or more of the optical splitters 72 may be parked in the optical fiber parking area 89. An optional fiber support 95 may also be provided as part of the transition panel 54' to guide parked optical fibers to prevent them from dropping to the bottom of the transition panel 54' and incurring sharp bending.

Figure 7:
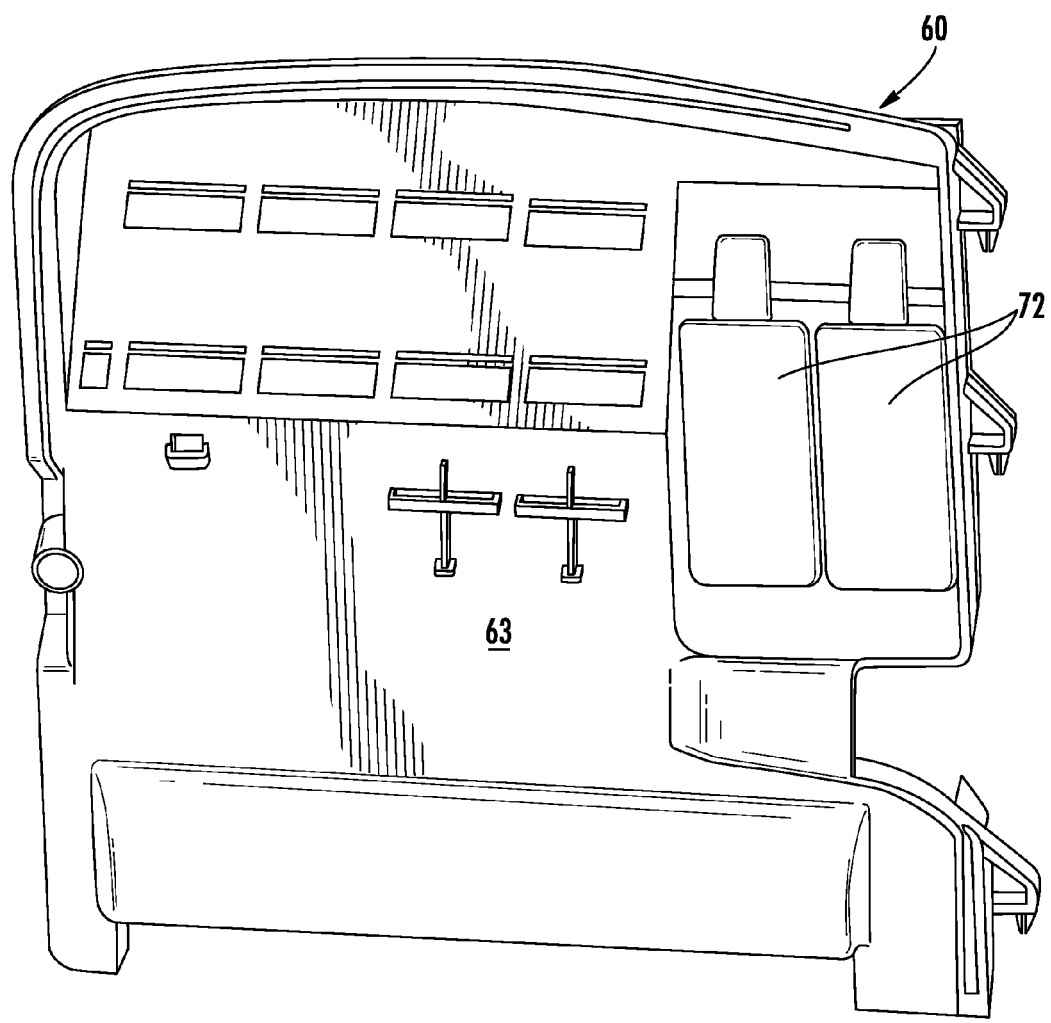
FIG. 7 illustrates another alternative embodiment of a transition panel for the fiber optic terminal of FIG. 2 having one or more optical fiber splitters located on the rear side of the transition panel.

As an example of another variation, the optical splitters 72 do not have to be provided on the transition panel 54 in the upper fiber management area 58. FIG. 7 illustrates a transition panel 54 where two optical splitters 72 provided on the rear side 63 of the transition panel 54 such that the optical splitters 72 are contained in the lower fiber management area 56 when the transition panel 54 is closed on the base 32. Although not limiting, providing optical splitters 72 on the rear side 63 of the transition panel 54 may be well-suited when using input and output fibers 70, 74 that are smaller in diameter, such as 900 micrometers (μm) for example. Space limitations in the lower fiber management area 56 and routing limitations between the rear side 63 and front side 61 of the transition panel 54 could be factors affecting providing optical splitters 72 on the rear side 63 of the transition panel 54.

Figure 8:
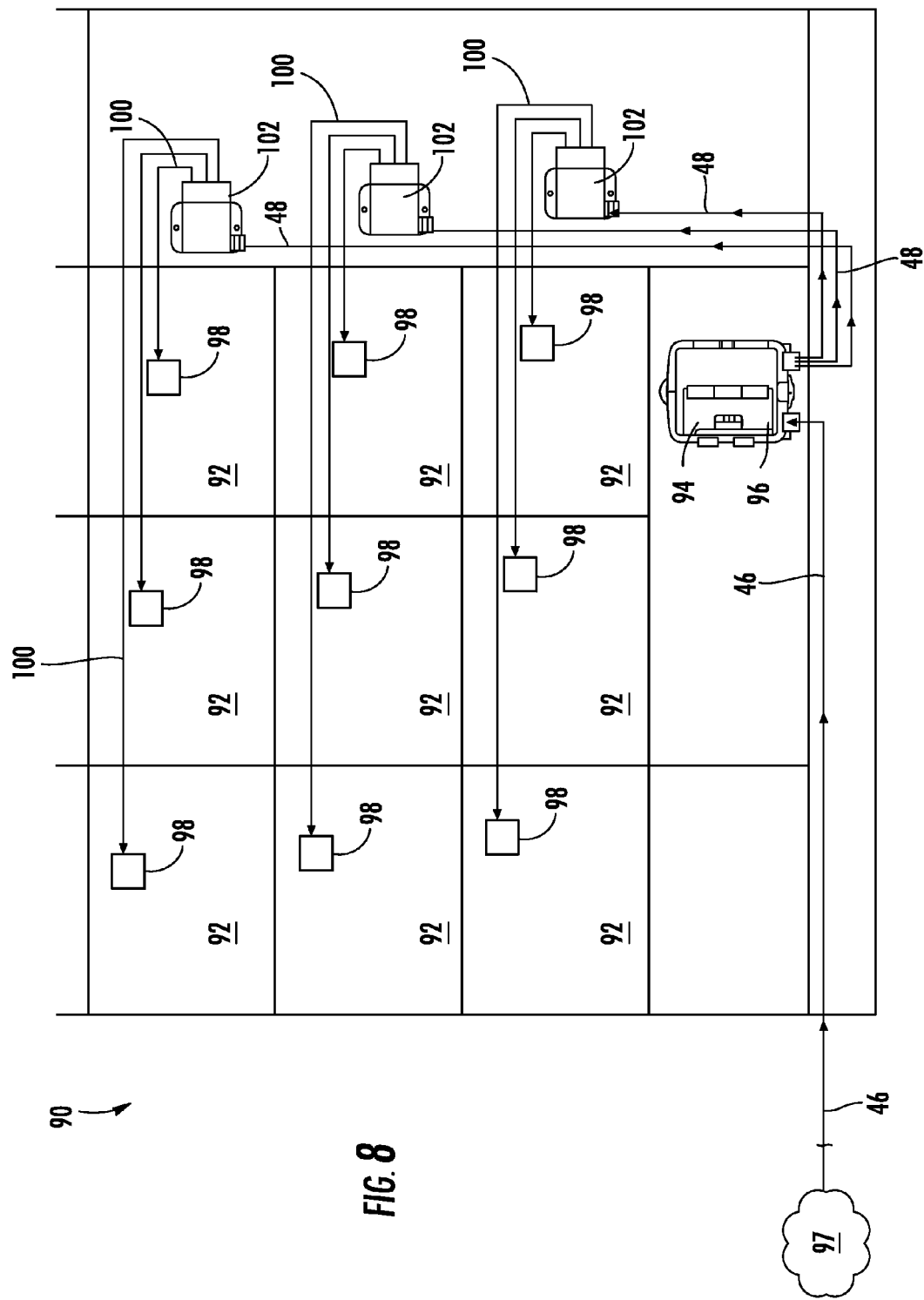
FIG. 8 illustrates a side view of an exemplary multi-dwelling unit (MDU) that includes fiber optic terminals according to the embodiments described herein, including local convergence points (LCPs) and exemplary fiber distribution terminals (FDTs) for providing optical fiber connectivity to end subscribers.

The fiber optic terminal 30 may be installed in any location or premise. The fiber optic terminal 30 described herein may be particularly suited for MDUs, because the fiber optic terminal 30 is capable of providing high density optical connections between a network-side cable(s) and a subscriber-side cable. Further, the fiber optic terminal 30 may be configured as either an LCP or an FDT. In this regard, FIG. 8 illustrates the fiber optic terminal 30 provided as both LCPs and FDTs installed in an MDU 90. The MDU 90 may comprise an apartment building having nine (9) dwelling units 92 for illustrative purposes only. The fiber optic terminal 30, configured as a LCP 94, is positioned on the ground floor or basement in the illustrated embodiment; however, the LCP of further embodiments is positioned at any location relative to the MDU. The LCP 94 includes a cable assembly 96 that is optically connected to a network-side cable 46, as described above. The network-side cable 46 may be optically connected to a fiber optic network 97. As also described above, one or more subscriber-side cables 48 carrying optical signals to and from the fiber optic network 97 can be connected to the LCP 94, and exit the LCP 94 and extend throughout the MDU 90. The subscriber-side cables 48 carry optical signals to and from the LCP 94 and extend directly to each dwelling unit via subscriber-side fibers or cables 100 and eventually terminate at a subscriber termination point 98, such as an adapter in a wall outlet, an adapter in a floor panel, an adapter behind a ceiling tile, or the like such that the subscriber can optically connect to a subscriber optical fiber 100.

The subscriber-side optical fibers 100 can be directed from optical fibers from the subscriber-side cable 48, or can be provided from one or more intermediate fiber optic terminals 30 configured as FDTs 102. FDTs 102 can be provided to simplify the routing and installation of the optical fibers between the LCP 94 and the subscriber termination points 98 by allowing the subscriber optical fibers 100 to be grouped between the LCP 94 and FDTs 102 and then separated at the FDTs 102. The FDTs 102 are configured to receive the subscriber-side cables 48 and provide the individual subscriber optical fibers 100 to the subscriber termination points 98. Accordingly, there are fewer optical fibers and/or cables extending between the floors of the MDU 90 thus simplifying routing of optical fibers through the MDU 90. Although floors of an MDU 90 are described in the illustrated embodiments, it should be appreciated that FDTs 102 may be used to facilitate optical fiber routing to any layout of areas within an MDU 90.

Further, although the subscriber optical fibers 100 and subscriber-side cables 48 include arrows pointing in the direction of the subscriber termination points 98, it should be appreciated that optical signals may be passed in either direction as required for the particular application; the arrows are merely provided for illustrative purposes.

As used herein, the term "fiber optic terminal" is intended to include any type of fiber optic terminal. For example, the fiber optic terminal as used herein can be a splice terminal, patch terminal or the like, or any combination thereof. The adapter panels provided in one or more adapter modules in a fiber optic terminal are not limited to provide fiber optic adapters. If fiber optic adapters are provided, the fiber optic adapters may be for any type of optical connector, including but not limited to an LC, SC, MTP, FC, ST, MU, or MTRJ, without limitation.

The fiber optic terminal 30 may be installed in any location, including an aerial location, buried, or disposed in a larger enclosure, such as a ground pedestal. The network-side and subscriber-side cables 46, 48 may be any type of fiber optic cable and include any type of optical fibers in any form. The term "optical fibers" as used herein is intended to include all types of optical fibers, including but not limited to loose buffered optical fibers, and in any form, including but not limited to a multi-fiber ribbon, individual optical fibers, or any other known expedient of a fiber optic cable. Additionally, the optical fibers may have various diameters, including for example only, diameters of 900 micrometers (µm), 2 millimeters (mm) and 3 mm.

The fiber optic terminals disclosed herein may be used for any fiber optic distribution application, including but not limited to directly or intermediately routing fiber optic cables and optical fibers from a fiber optic network(s) to end subscribers, including but not limited to various fiber-to-the-premises (FTTP), fiber-to-the-home (FTTH), and other fiber initiatives (generally described as FTTx). Subscriber premises include, but are not limited to single-dwelling units (SDU), multi-dwelling units (MDU), businesses, and/or other facilities or buildings.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention and are intended to be covered by the appended claims. It will also be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A fiber optic terminal, comprising:
 a base configured to receive at least one network-side fiber and a plurality of subscriber-side fibers;
 a transition panel coupled to the base and defining a fiber parking area, the fiber parking area comprising a protruding portion having a plurality of orifices, each orifice configured to pass a portion of an unconnected optical fiber through a wall of the protruding portion;
 an adapter module coupled to the base, the adapter panel comprising at least one adapter panel for carrying a plurality of fiber optic adapters, the plurality of fiber optic adapters comprised of:
 at least one input fiber optic adapter disposed in the at least one adapter panel, such that the at least one input fiber optic adapter is accessible from a front side and a rear side of the adapter panel, configured to optically connect to the at least one network-side fiber; and
 a plurality of output fiber optic adapters disposed in the at least one adapter panel, such that the plurality of output fiber optic adapters is accessible from the front side, configured to optically connect to the plurality of subscriber-side fibers; and
 an optical splitter configured to optically split an input fiber optically connected to the at least one input fiber optic adapter into a plurality of output fibers optically connected to the plurality of output fiber optic adapters, such that the at least one network-side fiber is optically connected to one or more of the plurality of subscriber-side fibers.

2. The fiber optic terminal of claim 1, wherein the at least one network-side fiber is provided in a network-side cable, and the plurality of subscriber-side fibers are provided in a subscriber-side cable.

3. The fiber optic terminal of claim 1, wherein the fiber optic terminal is a terminal comprised from the group consisting of a fiber distribution terminal (FDT) and a local convergence point (LCP).

4. The fiber optic terminal of claim 1, further comprising:
 at least one network-side splice configured to splice the at least one network-side fiber into at least one input pigtail;
 wherein the at least one input pigtail is configured to optically connect to the at least one input fiber optic adapter to optically connect the at least one network-side fiber to the at least one input fiber optic adapter.

5. The fiber optic terminal of claim 1, further comprising:
 a plurality of subscriber-side splices configured to splice the plurality of subscriber-side fibers into a plurality of output pigtails;
 wherein the plurality of output pigtails are configured to optically connect to one or more of the plurality of output fiber optic adapters to optically connect the plurality of subscriber-side fibers to the one or more of plurality of output fiber optic adapters.

6. The fiber optic terminal of claim 1, wherein the transition panel is hingedly affixed to the base to rotate about the base.

7. The fiber optic terminal of claim 1, wherein the transition panel defines the protruding portion, the protruding portion being configured to guide one or more of the plurality of output fibers into the fiber parking area.

8. The fiber optic terminal of claim 1, wherein the transition panel includes a front side and a rear side, wherein the adapter module is disposed on the front side of the transition panel.

9. The fiber optic terminal of claim 8, wherein the transition panel defines an upper fiber management area on the front side of the transition panel and a lower fiber management area on the rear side of the transition panel.

10. The fiber optic terminal of claim 9, further comprising a fiber parking area disposed in the upper fiber management area configured to park one or more of the plurality of output fibers.

11. The fiber optic terminal of claim 9, further comprising:
at least one network-side splice located in the lower fiber management area and configured to splice the at least one network-side fiber into at least one input pigtail;
wherein the at least one input pigtail is configured to optically connect to the at least one input fiber optic adapter to optically connect the at least one network-side fiber to the at least one input fiber optic adapter.

12. The fiber optic terminal of claim 9, further comprising:
a plurality of subscriber-side splices located in the lower fiber management area and configured to splice the plurality of subscriber-side fibers into a plurality of output pigtails;
wherein the plurality of output pigtails are configured to optically connect to one or more of the plurality of output fiber optic adapters to optically connect the plurality of subscriber-side fibers to the one or more of plurality of output fiber optic adapters.

13. The fiber optic terminal of claim 8, wherein the optical splitter is mounted to either the front side of the transition panel or the rear side of the transition panel.

14. The fiber optic terminal of claim 1, wherein the at least one input fiber optic adapter, the plurality of output fiber optic adapters, or both the at least one input fiber optic adapter and the plurality of output fiber optic adapters are keyed.

15. The fiber optic terminal of claim 1, wherein the input fiber, the plurality of output fibers, or both the input fiber and the plurality of output fibers are distinctly marked.

16. The fiber optic terminal of claim 1, wherein:
the at least one adapter panel comprises a plurality of non-coplanar adapter panels; and
at least one of the plurality of fiber optic adapters is disposed on each of the plurality of the non-coplanar adapter panels.

17. The fiber optic terminal of claim 16, wherein the plurality of non-coplanar adapter panels are parallel to each other.

18. The fiber optic terminal of claim 16, wherein the plurality of non-coplanar adapter panels are at an acute angle to the housing when at least one adapter panel is in a stowed position.

19. A method for optically connecting a subscriber-side fiber to a fiber optic network, comprising:
providing a fiber optic terminal having an adapter module comprised of transition panel movably connected to a base of the fiber optic terminal, the transition panel having at least one adapter panel;
providing at least one network-side fiber into the fiber optic terminal;
providing a plurality of subscriber-side fibers into the fiber optic terminal;
optically connecting the at least one network-side fiber to at least one input fiber optic adapter disposed in the at least one adapter panel such that the at least one input fiber optic adapter is accessible from a front side and a rear side of the adapter panel;
optically connecting one or more of the plurality of subscriber-side fibers to one or more of a plurality of output fiber optic adapters disposed in the at least one adapter panel such that the plurality of fiber optic adapters are accessible from a front side and a rear side of the adapter panel;
passing one or more of the plurality of subscriber-side fibers through one or more of a plurality of orifices contained in a protruding portion of a parking panel disposed in the at least one transition panel;
providing an optical splitter that splits an input fiber into a plurality of output fibers; and
optically connecting the input fiber to the at least one input fiber optic adapter and optically connecting one or more of the plurality of output fibers to one or more of the plurality of output fiber optic adapters, to optically connect the at least one network-side fiber to one or more of the plurality of subscriber-side fibers.

20. The method of claim 19, wherein optically connecting the at least one network-side fiber to the at least one input fiber optic adapter, comprises:
splicing the at least one network-side fiber into at least one input pigtail; and
optically connecting the at least one input pigtail to the at least one input fiber optic adapter.

21. The method of claim 19, wherein optically connecting one or more of the plurality of subscriber-side fibers to one or more of the plurality of output fiber optic adapters comprises:
splicing one or more of the plurality of subscriber-side fibers into one or more output pigtails; and
optically connecting the one or more output pigtails to one or more of the plurality of output fiber optic adapters.

22. The method of claim 19, wherein providing the at least one network-side fiber into the fiber optic terminal comprises providing the at least one network-side fiber into a lower fiber management area disposed on a rear side of a transition panel disposed in the fiber optic terminal.

23. The method of claim 19, wherein providing the plurality of subscriber-side fibers into the fiber optic terminal comprises providing the plurality of subscriber-side fibers into a lower fiber management area disposed on a rear side of a transition panel disposed in the fiber optic terminal.

* * * * *